US010642478B2

(12) United States Patent
Snyder

(10) Patent No.: US 10,642,478 B2
(45) Date of Patent: May 5, 2020

(54) EDITABLE WHITEBOARD TIMELINE

(71) Applicant: Microsoft Technology Licensing, LLC, Redmond, WA (US)

(72) Inventor: Scott H. W. Snyder, Seattle, WA (US)

(73) Assignee: MICROSOFT TECHNOLOGY LICENSING LLC, Redmond, WA (US)

( * ) Notice: Subject to any disclaimer, the term of this patent is extended or adjusted under 35 U.S.C. 154(b) by 117 days.

(21) Appl. No.: 15/483,664

(22) Filed: Apr. 10, 2017

(65) Prior Publication Data
US 2018/0292964 A1   Oct. 11, 2018

(51) Int. Cl.
| | |
|---|---|
| *G06F 3/048* | (2013.01) |
| *G06F 16/00* | (2019.01) |
| *G06F 3/0488* | (2013.01) |
| *G06F 3/0484* | (2013.01) |
| *G06F 16/11* | (2019.01) |
| *G06F 17/24* | (2006.01) |
| *G06F 17/22* | (2006.01) |

(52) U.S. Cl.
CPC ........ *G06F 3/0488* (2013.01); *G06F 3/04845* (2013.01); *G06F 16/113* (2019.01); *G06F 17/242* (2013.01); *G06F 17/2288* (2013.01)

(58) Field of Classification Search
CPC . G06F 3/048; G06F 17/30; G06F 3/00; G06F 17/00; G06F 16/00; G06F 16/90; G06F 16/21; G06Q 10/00; G06T 13/80
See application file for complete search history.

(56) References Cited

U.S. PATENT DOCUMENTS

| | | | |
|---|---|---|---|
| 7,260,257 B2 | 8/2007 | Zhang et al. | |
| 8,805,929 B2 | 8/2014 | Erol et al. | |
| 8,839,087 B1 * | 9/2014 | Hayden | G06F 17/2288 715/204 |
| 2002/0163548 A1 | 11/2002 | Chiu et al. | |

(Continued)

OTHER PUBLICATIONS

Brotherton, et al., "Automated Capture, Integration, and Visualization of Multiple Media Streams", In Proceedings of IEEE International Conference on Multimedia Computing and Systems, Jun. 28, 1998, pp. 1-12.

(Continued)

*Primary Examiner* — Hugo Molina

(57) ABSTRACT

Systems and methods for recording and archiving whiteboard sessions associated with an electronic whiteboard. In aspects, archived whiteboard sessions may be assigned to bookmarks along a whiteboard timeline, which may be editable. For instance, one or more ink strokes associate with an archived whiteboard session may be edited, i.e., added, deleted and/or altered in any way. Moreover, a bookmark corresponding to an archived whiteboard session may be renamed and/or relocated along the whiteboard timeline. In this way, whiteboard sessions may be updated or augmented for future use, may be organized in any suitable order along the whiteboard timeline (e.g., regardless of chronology), and may be named according to descriptive titles or topics (e.g., as opposed to automated date-stamping based on receipt date). In this way, an editable timeline associated with an electronic whiteboard may provide an organized library of readily-presentable content.

20 Claims, 23 Drawing Sheets

(56) References Cited

U.S. PATENT DOCUMENTS

| | | | |
|---|---|---|---|
| 2004/0056903 A1* | 3/2004 | Sakai | G06F 16/168 715/853 |
| 2007/0120871 A1* | 5/2007 | Okamoto | G06F 3/04855 345/619 |
| 2010/0023851 A1 | 1/2010 | Schormann | |
| 2014/0019455 A1* | 1/2014 | Cochrane | G06T 11/206 707/741 |
| 2014/0245152 A1 | 8/2014 | Carter et al. | |
| 2015/0032785 A1* | 1/2015 | Itasaki | G06F 16/148 707/827 |
| 2015/0127340 A1 | 5/2015 | Epshteyn et al. | |
| 2015/0127643 A1* | 5/2015 | Cohen | G06F 16/447 707/725 |
| 2015/0331604 A1* | 11/2015 | Tse | G06F 3/04883 345/173 |
| 2015/0339282 A1* | 11/2015 | Goyal | G06F 17/241 715/229 |
| 2016/0072862 A1 | 3/2016 | Bader-natal et al. | |
| 2016/0092043 A1* | 3/2016 | Missig | G06F 3/0482 715/811 |
| 2016/0266734 A1* | 9/2016 | Takeuchi | H04L 12/1827 |
| 2017/0221253 A1* | 8/2017 | Banerjee | G06T 11/001 |
| 2018/0039951 A1* | 2/2018 | Wynn | G06Q 10/1095 |

OTHER PUBLICATIONS

"eno interactive whiteboard user guide", http://aaustem.oia.arizona.edu/sites/default/files/eno%20interactive%20whiteboard%20user%20guide.pdf, Retrieved on: Feb. 14, 2017, 75 pages.

Geyer, et al., "A Team Collaboration Space Supporting Capture and Access of Virtual Meetings", In Proceedings of the 2001 International ACM SIGGROUP Conference on Supporting Group Work, Sep. 30, 2001, pp. 188-196.

Golovchinsky, et al., "Beyond the Drawing Board: Toward More Effective Use of Whiteboard Content", In Journal of Computing Research Repository, Nov. 2009, 10 pages.

Mangano, et al., "Calico: A Tool for Early Software Design Sketching", http://www.ics.uci.edu/~andre/papers/C71.pdf, Published on: 2008, 6 pages.

"Replay your ink strokes in Office", https://support.office.com/en-us/article/Replay-your-ink-strokes-in-Office-fa4f044f-810b-43fe-b774-da04a0b37496?ui=en-US&rs=en-US&ad=US, Retrieved on: Feb. 14, 2017, 3 pages.

"How to use Bookmarks to Stitch together highlight reels", http://support.plays.tv/support/solutions/articles/5000659680-how-to-use-bookmarks-to-stitch-together-highlight-reels, Published on: Apr. 28, 2016, 3 pages.

* cited by examiner

FIG. 5B

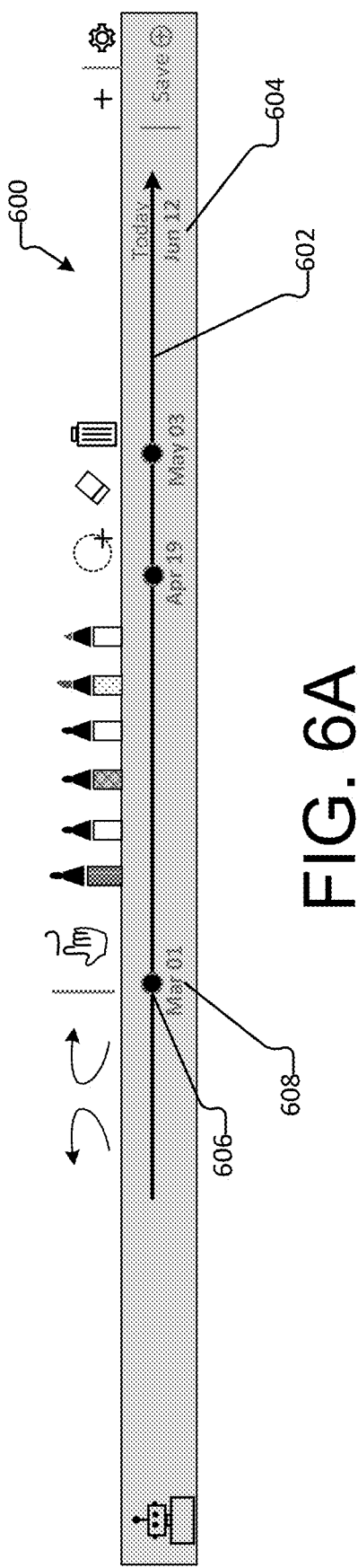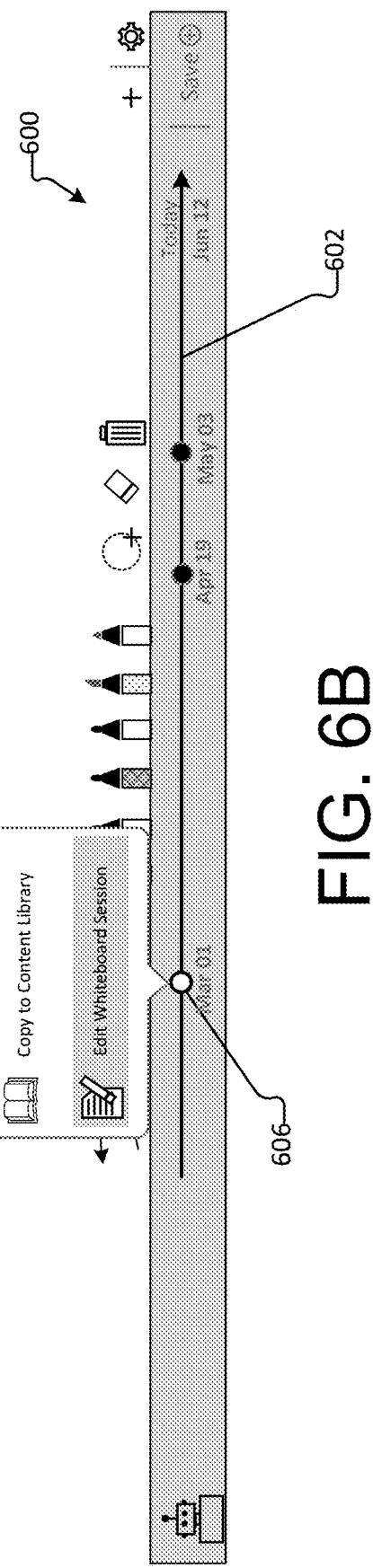

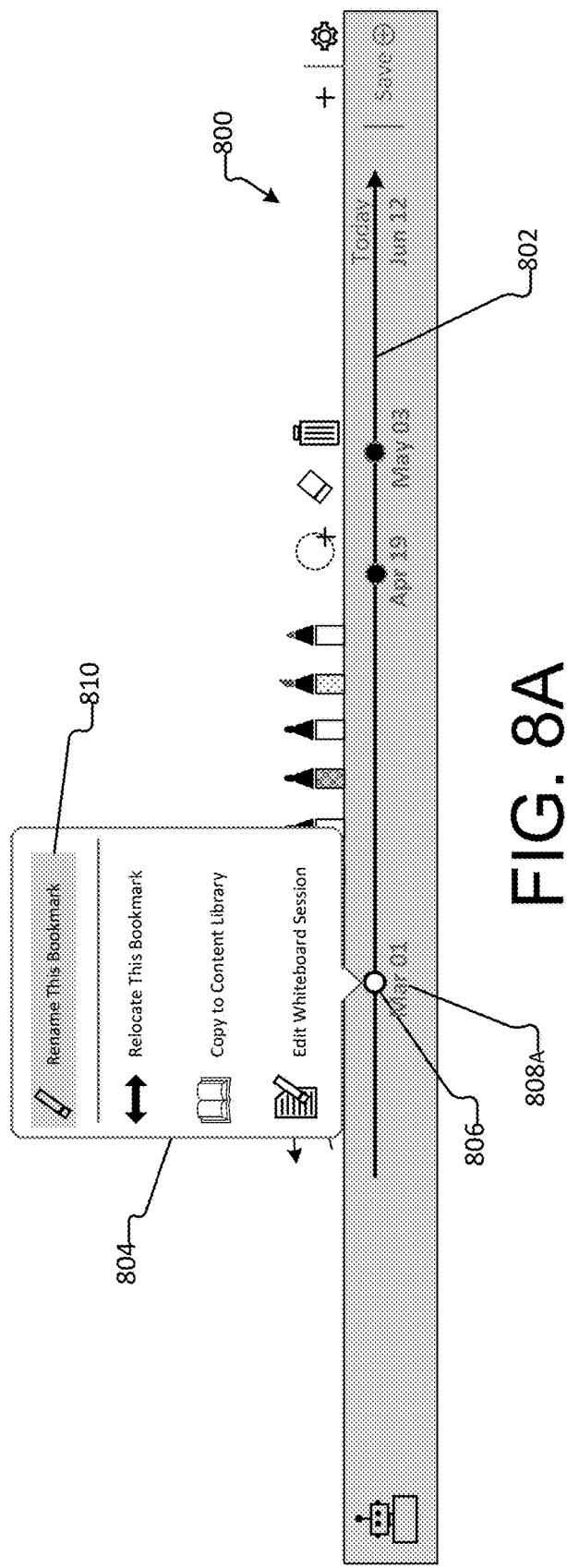
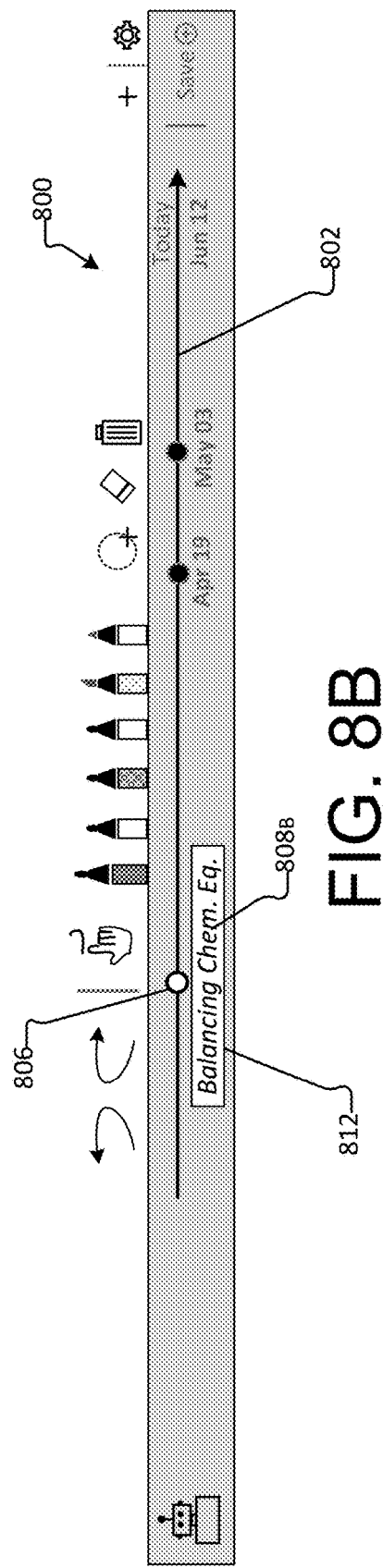
FIG. 8A
FIG. 8B

EDITABLE WHITEBOARD TIMELINE

BACKGROUND

Today, electronic whiteboards may include a timeline representing a collection of work in chronological order. The chronology is helpful for reviewing and rehydrating content, e.g., a teacher may wish to continue a prior lesson and may do so by tapping on an event along the timeline or clicking "Restore" to continue from where the last class left off. The timeline can also allow for playback of a whiteboard session, e.g., a student may replay the ink strokes for the session over time as a video lecture.

It is with respect to these and other general considerations that embodiments have been described. Also, although relatively specific problems have been discussed, it should be understood that the embodiments should not be limited to solving the specific problems identified in the background.

SUMMARY

The disclosure generally relates to a system and methods for recording and archiving (or storing) whiteboard sessions associated with an electronic whiteboard. As described herein, an electronic whiteboard may comprise a large-screen interactive computing device (e.g., a Microsoft® Surface Hub® or other large-screen, touch-enabled display), a plurality of computing devices that interoperate to provide a tiled screen display, a touch-sensitive "board" or screen upon which digital images are projected, etc. As used herein, the term "whiteboard session" may refer to receipt of any number of ink strokes (e.g., from one ink stroke to a plurality of ink strokes) on an electronic whiteboard over any period of time, whether continuous or intermittent. That is, a whiteboard session may be initiated at a first time, paused, and then continued at a later time. "Archiving" (or "storing") a whiteboard session refers to a process of saving at least one ink stroke and sequentially saving each subsequent ink stroke in a series. Archiving (or storing) a whiteboard session may occur automatically as each ink stroke is received and/or may be initiated based on triggers within the whiteboard application, such as activating a trashcan control, transitioning to a new calendar day, detecting a new participant joining a whiteboard session, etc. In some cases, a whiteboard session may be stored in response to a user indication.

In aspects, archived whiteboard sessions may be assigned to bookmarks along a whiteboard timeline. The whiteboard timeline may further be editable such that the archived whiteboard sessions, as well as the corresponding bookmarks, may be edited. For instance, one or more ink strokes associate with an archived whiteboard session may be edited, i.e., added, deleted and/or altered in any way. Moreover, a bookmark corresponding to an archived whiteboard session may be renamed and/or relocated along the whiteboard timeline. In this way, whiteboard sessions may be updated or augmented for future use, may be organized in any suitable order along the whiteboard timeline (e.g., regardless of chronology), and may be named according to descriptive titles or topics (e.g., as opposed to automated date-stamping based on receipt date). In this way, an editable timeline associated with an electronic whiteboard may provide an organized library of readily-presentable content for educators, entrepreneurs, marketing and sales professionals, negotiators, accountants, bankers, lawyers, etc.

In an aspect, a computer system is provided. The computer system includes at least a processing unit and a memory storing computer executable instructions that, when executed by the processing unit, cause the computer system to perform a method. The method includes receiving a series of ink strokes during a session on an electronic whiteboard and storing the session including the series of ink strokes to a bookmark on a timeline. The method further includes receiving a selection of the bookmark, receiving an edit to the stored session, and storing the edited session.

In another aspect, a computer-implemented method for editing a whiteboard timeline is provided. The method includes receiving a series of ink strokes on an electronic whiteboard and associating the series of ink strokes with a bookmark at a first position on a timeline. The method further includes receiving a selection of the bookmark and receiving an indication to reposition the bookmark to a second position on the timeline.

In yet another aspect, a computer storage medium is provided. The computer storage medium store computer executable instructions that, when executed by at least one processing unit, cause a computer system to receive a series of ink strokes during a session on an electronic whiteboard and associate the session including the series of ink strokes with a bookmark on a timeline, where the bookmark has a bookmark name. The computer system is further caused to receive a selection of the bookmark and receive an indication to rename the bookmark on the timeline.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIGS. 5A-5C illustrate a whiteboard interface displaying a series of ink strokes received during a whiteboard session over time, according to an example embodiment.

FIGS. 6A-6B illustrate a toolbar of a whiteboard interface including an editable timeline, according to an example embodiment.

FIGS. 8A-8C illustrate a toolbar for editing a bookmark name associated with a bookmark along a timeline of a whiteboard interface, according to an example embodiment.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As described above, the disclosure generally relates to a system and methods for recording and archiving whiteboard sessions associated with an electronic whiteboard. In aspects, archived whiteboard sessions may be assigned to bookmarks along a whiteboard timeline. The whiteboard timeline may further be editable such that the archived whiteboard sessions, as well as the corresponding bookmarks, may be edited. For instance, one or more ink strokes associate with an archived whiteboard session may be edited, i.e., added, deleted and/or altered in any way. Moreover, a bookmark corresponding to an archived whiteboard session may be renamed and/or relocated along the whiteboard timeline. In this way, whiteboard sessions may be updated or augmented for future use, may be organized in any suitable order along the whiteboard timeline (e.g., regardless of chronology), and may be named according to descriptive titles or topics (e.g., as opposed to automated date-stamping based on receipt date). In this way, an editable timeline associated with an electronic whiteboard may provide an organized library of readily-presentable content for educators, entrepreneurs, marketing and sales professionals, negotiators, accountants, bankers, lawyers, etc.

Figure 1A:
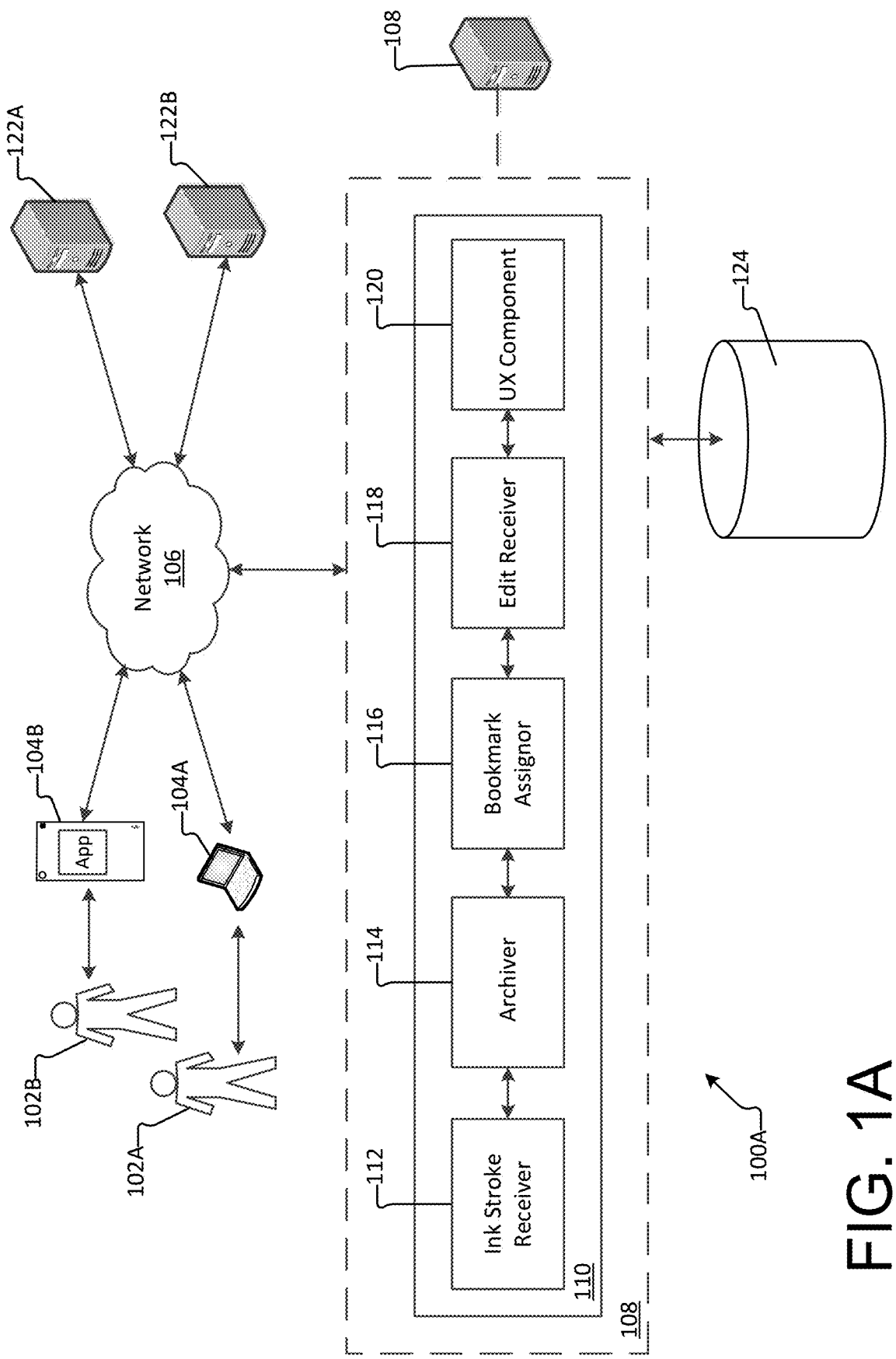
FIGS. 1A-1B illustrate systems for providing an electronic whiteboard with an editable timeline, according to an example embodiment.
Figure 1B:
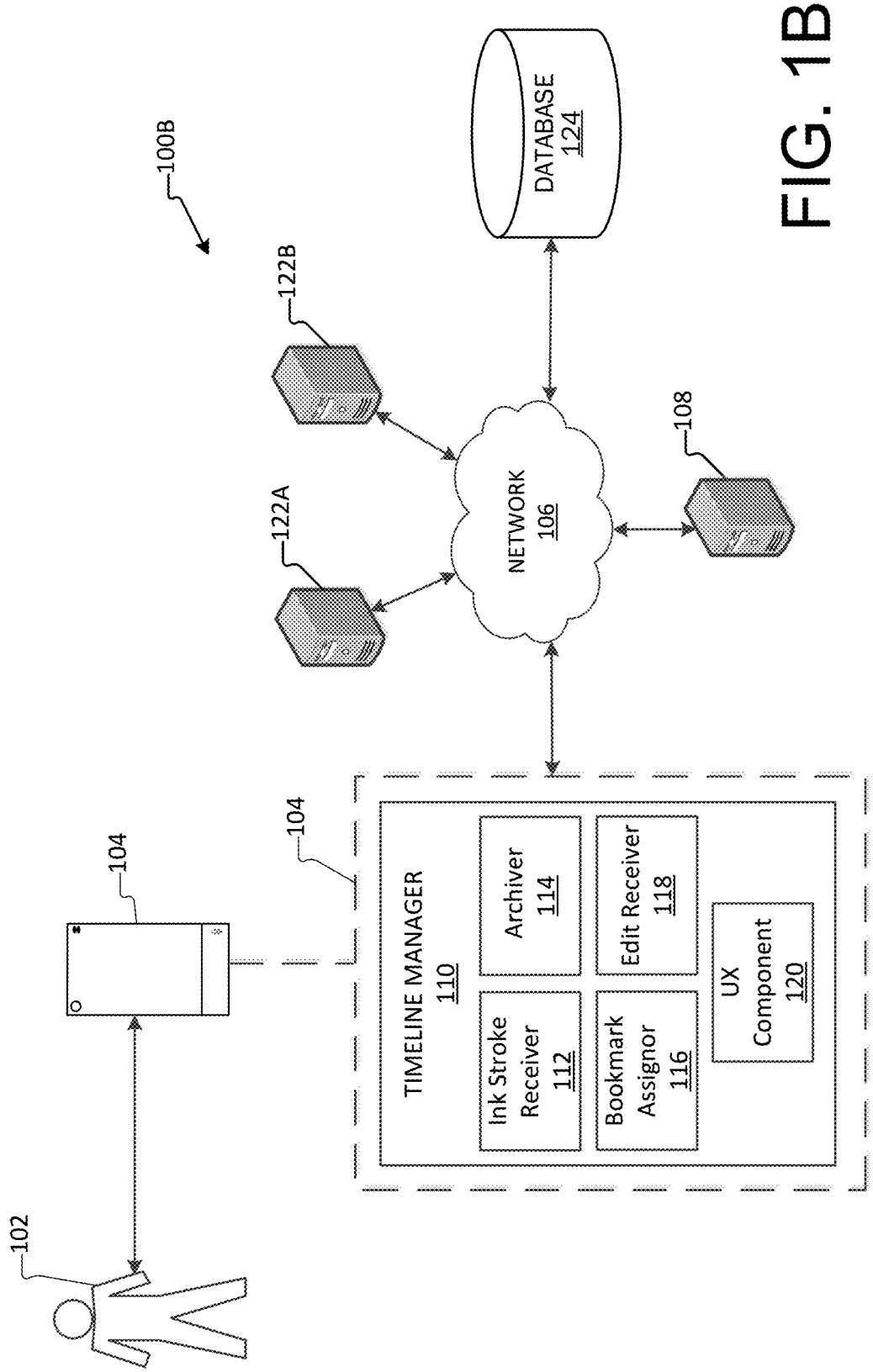

FIGS. 1A and 1B illustrate a system for providing an electronic whiteboard with an editable timeline, according to an example embodiment.

As illustrated, system 100 (e.g., system 100B of FIG. 1B) may include one or more client computing devices 104 that may execute a client version of a whiteboard timeline manager capable of archiving whiteboard sessions (or "sessions") along a whiteboard timeline. In some examples, a client whiteboard timeline manager may execute locally on one or more client computing devices 104. In other examples, as illustrated by system 100A of FIG. 1A, the client whiteboard timeline manager (e.g., a mobile app on a thin client computing device 104A or 104B) may operate in communication (e.g., via network 106) with a corresponding server version of whiteboard timeline manager 110 executing on one or more server computing devices, e.g., server computing device 108. In still other aspects, rather than executing a client version of a whiteboard timeline manager, the one or more client computing devices 104 may remotely access, e.g., over network 106, the whiteboard timeline manager 110 implemented on the server computing device 108 or multiple server computing devices (e.g., in a distributed computing environment such as a cloud-computing environment). In aspects, the whiteboard timeline manager, whether executed on a client, a server, or in a cloud-computing environment, may be integrated into or in communication with an electronic (or digital) whiteboard, which may itself execute on one or more of the same or different client and/or server computing devices.

As illustrated by FIG. 1A, a server version of whiteboard timeline manager 110 is implemented by server computing device 108. As should be appreciated, the server version of whiteboard timeline manager 110 may also be implemented in a distributed environment (e.g., cloud-computing environment) across a plurality of server computing devices (not shown). Moreover, as should be appreciated, either a client or a server version of the whiteboard timeline manager may be capable of archiving whiteboard sessions along a whiteboard timeline and receiving edits to the archived whiteboard sessions. While whiteboard timeline manager 110 and associated components 112-120 are shown and described, this should not be understood as limiting. That is, additional or different components may be implemented by a whiteboard timeline manager in order to archive whiteboard sessions along a whiteboard timeline and receive edits to the archived whiteboard sessions.

In a basic configuration, the one or more client computing devices 104 are personal or handheld computers having both input elements and output elements operated by one or more users 102 (e.g., user 102A and user 102B illustrated by FIG. 1A). In some instances, users 102A and 102B may include users of an electronic whiteboard. For example, the one or more client computing devices 104 (e.g., client computing devices 104A and 104B) may include one or more of: a large-screen interactive computing device; a plurality of interoperative computing devices that provide a tiled and/or rotatable screen display; a mobile telephone; a smart phone; a tablet; a phablet; a personal computer; a desktop computer; a laptop computer; a gaming device/computer (e.g., Xbox®); a television; and the like. This list is exemplary only and should not be considered as limiting. Any suitable client computing device for executing a whiteboard timeline manager and/or remotely accessing whiteboard timeline manager 110 may be utilized.

In some aspects, network 106 is a computer network such as an enterprise intranet and/or the Internet. In this regard, the network 106 may include a Local Area Network (LAN), a Wide Area Network (WAN), the Internet, wireless and wired transmission mediums. In further aspects, client computing device 104 and/or server computing device 108 may communicate with some components of the system via a local network (e.g., an enterprise intranet), whereas client computing device 104 and/or server computing device 108 may communicate with other components of the system via a wide area network (e.g., the Internet). In addition, the aspects and functionalities described herein may operate over distributed systems (e.g., cloud-computing systems), where application functionality, memory, data storage and retrieval, and various processing functions may be operated remotely from each other over a distributed computing network, such as the Internet or an intranet.

As described above, the whiteboard timeline manager 110 may be implemented on a server computing device 108 and/or a client computing device 104. In a basic configuration, server computing device 108 (or client computing device 104) may include at least a processing unit and a system memory for executing computer-readable instructions. In some aspects, server computing device 108 may comprise one or more server computing devices 108 in a distributed environment (e.g., cloud-computing environment). Server computing device 108 may receive ink strokes for a whiteboard session, archive the whiteboard session in one or more databases (e.g., database 124), assign a bookmark to the whiteboard session along a whiteboard timeline, and receive edits to the archived whiteboard session in the one or more databases.

As illustrated in FIGS. 1A and 1B, the whiteboard timeline manager 110 may include various components for archiving one or more ink strokes and/or whiteboard sessions along a timeline, including an ink stroke receiver 112, an archiver 114, a bookmark assignor 116, an edit receiver 118, and a UX component 120, and the like. In aspects, each component may communicate and pass data between the other components. The various components may be implemented using hardware, software, or a combination of hardware and software. Moreover, the various components may be executed on a single server computing device (e.g., server computing device 108), on multiple server computing devices (e.g., server computing devices 122A and/or 122B), or locally on a client computing device (e.g., client computing device 104A or 104B). For example, as described above, the whiteboard timeline manager 110 may be configured to receive one or more ink strokes of a whiteboard session, archive the whiteboard session, assign a bookmark along a whiteboard timeline to the archived whiteboard session, and/or receive edits to the archived whiteboard session.

In aspects, whiteboard timeline manager 110 may include ink stroke receiver 112, which may receive one or more ink strokes of a whiteboard session. An ink stroke may refer to any input on an electronic whiteboard, including a drawing input, a keystroke input, a click input, swipe input, etc., which may be received via touch, stylus, keyboard, mouse, gesture, etc. For instance, a teacher may present a topic (e.g., a chemistry lesson) during a sixth period class from 2:10 pm to 2:55 pm on Thursday, Jan. 5, 2017. The chemistry lesson may involve a series of ink strokes depicting a chemical formula and various notes related to the chemical formula. In another example, a business associate may present a topic (e.g., branding proposals) for a product line from 10:25 am to 11:55 am, and then from 1:10 pm to 2:20 pm following a lunch break. The discussion regarding branding proposals may involve a series of ink strokes depicting various potential logos, trademarks, packaging options, etc. In aspects, each ink stroke may be associated with a timestamp or other temporal indicator as the ink stroke is received within the series of ink strokes. As should be appreciated, any topic in any setting (e.g., business, education, legal, etc.) may be presented using an electronic whiteboard over any suitable period of time.

The archiver 114 may archive the series of ink strokes as a whiteboard session. In aspects, a whiteboard session may refer to a series of ink strokes over a period of time. In some aspects, the period of time may comprise a continuous period of time (with a single start time and a single end time); in other aspects, the period of time may be a non-continuous period of time (including a plurality of start times and end times). Referring to the first example above, the series of ink strokes depicting the chemical formula and the various notes related to the chemical formula may be archived as a whiteboard session. In this case, the period of time for the whiteboard session associated with the chemistry lesson may be a continuous 45-minute period of time, with a start time of 2:10 pm and an end time of 2:55 pm. In further aspects, each ink stroke associated with the chemistry lesson may be recorded and archived in the order in which it was received over the period of time. In the second example, the business whiteboard presentation regarding branding proposals may include a first series of ink strokes received between 10:25 am and 11:55 am and a second series of ink strokes received between 1:10 pm and 2:20 pm (e.g., after the lunch break). In this case, e.g., based on user-selection or otherwise, the business whiteboard presentation may be archived as multiple whiteboard sessions, the first over a continuous 90-minute period of time with a start time of 10:25 am and an end time of 11:55 am, and the second over a continuous 70-minute period of time with a start time of 1:10 pm and an end time of 2:20 pm. Alternatively, the business whiteboard presentation may be archived as a single whiteboard session over a non-continuous 160-minute period of time, with a first start time of 10:25 am, a first end time of 11:55 am, a second start time of 1:10 pm, and a second end time of 2:20 pm. Similarly, each ink stroke associated with the business whiteboard presentation may be recorded and archived in the order in which it was received, whether archived in a single session or multiple sessions.

The bookmark assignor 116 may assign a bookmark to each of one or more archived whiteboard sessions along a whiteboard timeline. The whiteboard timeline may be a graphical toolbar including a selectable icon corresponding to each bookmark. In aspects, the bookmarks may be ordered chronologically along the whiteboard timeline. In other aspects, the bookmarks may be ordered according a user-selected ordering. In still other aspects, the bookmarks may be ordered according to a combination of chronological and user-selected ordering. Additionally, each bookmark may be associated with a bookmark name. The bookmark name may be automatically generated (e.g., based on a date and/or time associated with the corresponding whiteboard session) or may be assigned by a user. In some aspects, a selectable icon corresponding to a bookmark may display an associated bookmark name. Alternatively, a bookmark name may be displayed upon right clicking or hovering over the bookmark. In aspects, when a bookmark is selected (e.g., by clicking or otherwise activating the bookmark), the archived whiteboard session assigned to the bookmark may be displayed on the electronic whiteboard. In some cases, upon selection of a bookmark, the corresponding whiteboard session may automatically "play" each consecutive ink stroke of the series of ink strokes associated with the whiteboard session; in other cases, the corresponding whiteboard session may play upon additional activation of a "play control"; and in still other cases, the corresponding session may continue where the whiteboard session left off upon activation of a "resume" control. While the series of ink strokes may have been recorded over a period of time, playback of the series of ink strokes may be displayed over the same period of time or a different period of time (e.g., a condensed period of time or an extended period of time).

The edit receiver 118 may receive one or more edits to a bookmark and/or an archived whiteboard session. For instance, a bookmark may be selected (e.g., via right clicking a corresponding selectable icon) and a menu for performing one or more actions may be displayed. For instance, the menu may provide options for editing a bookmark name, relocating a bookmark, editing the corresponding archived whiteboard session, and the like. In aspects, a menu option may be selected by clicking, touching, swiping, etc. For example, in response to selecting an option for editing a bookmark name, the current bookmark name may be replaced by an edited bookmark name. In another example, in response to selecting an option for relocating a bookmark, the bookmark may be relocated from a current location to an edited location. For example, the bookmark may be dragged or otherwise relocated along the whiteboard timeline from the current location to the edited location. In still another example, in response to selecting an option for editing the corresponding archived whiteboard session, the archived whiteboard session may be opened (or launched) in an editing mode.

In some aspects, when the archived whiteboard session is opened in an editing mode, each ink stroke may be "played" in consecutive order within the series of ink strokes. In this way, edits received during playback of the archived whiteboard session may receive a temporal indicator within the series of ink strokes. In other aspects, when the archived whiteboard session is opened in an editing mode, an editing canvas may enable edits to any ink stroke, addition of ink strokes, deletion of ink strokes, etc. An edit may include any change to the series of ink strokes for a session, e.g., a color change to an ink stroke, a width change to an ink stroke, a length change to an ink stroke, a full or partial deletion of an ink stroke, a full or partial replacement of an ink stroke, a new ink stroke, etc. In some cases, e.g., if an edit is made to an existing ink stroke, the edited ink stroke may maintain its temporal position within the series of ink strokes. In other cases, e.g., if an edit involves a new ink stroke, the new ink stroke may receive a timestamp or other temporal indicator for placement within the series of ink strokes (e.g., based on when it was received during edit mode, based on adjacent ink strokes, or otherwise). In still other cases, e.g., if the edit involves a deletion and replacement of an ink stroke, the replacement ink stroke may maintain the temporal position of the deleted ink stroke within the series of ink strokes. As should be appreciated, multiple options are conceivable and may be implemented without departing from the present disclosure. After editing the one or more ink strokes, the edited whiteboard session may be saved to the bookmark corresponding to the archived whiteboard session. In some aspects, an edited whiteboard session may be designated in some way (e.g., italicized bookmark name or some other designation).

UX component 120 may communicate with one or more other components to provide an interface for creating and navigating a whiteboard timeline including one or more bookmarks corresponding to one or more archived whiteboard sessions. In aspects, one or more ink strokes associated with a whiteboard session may be received by an electronic whiteboard over a period of time. When the whiteboard session is complete, the whiteboard session may be archived (e.g., saved) and a bookmark may be assigned to the archived whiteboard session. With each successive archive event, additional bookmarks may be added to the whiteboard timeline such that the timeline continuously extends (or "grows") within the electronic whiteboard interface. In some aspects, the whiteboard timeline may include more bookmarks than are visible within the electronic whiteboard interface. In this case, a scroll bar or some other indication that the whiteboard timeline extends beyond the viewable area may be provided. For example, one or more ends of the timeline may be "grayed out" to indicate that the timeline extends beyond the viewable area. In aspects, a whiteboard session may be designated as "complete" based on one of many indications, e.g., receipt of a "save" control selection, receipt of a "trash" control selection, a timeout period, and the like.

The whiteboard timeline may further be configured to receive edits to the one or more bookmarks and/or the one or more archived whiteboard sessions. For example, each of the one or more bookmarks may be selectable (e.g., by activating a selectable icon associated with the bookmark). A bookmark may be selected for displaying a corresponding archived whiteboard session (e.g., left click) and/or may be selected for entering an edit mode (e.g., right click). In some cases, permissions may be associated with the whiteboard timeline such that a user must be granted permission to enter an edit mode. When in edit mode, the bookmark itself may be renamed and/or relocated along the whiteboard timeline. Additionally or alternatively, the corresponding archived whiteboard session may be edited. For instance, as described above, one or more ink strokes associated with the archived whiteboard session may be edited, deleted, added, etc. In some aspects, upon exiting the edit mode, the edited whiteboard session may be saved to the bookmark, effectively overwriting the archived whiteboard session. In other aspects, the edited whiteboard session may be associated with a different bookmark and the archived whiteboard session corresponding to the bookmark may be maintained. In some cases, a bookmark associated with an edited whiteboard session may provide an indication that the whiteboard session has been edited (e.g., the bookmark name may be italicized or bolded, a different selectable icon may be associated with the bookmark, etc.).

As should be appreciated, the various devices, components, etc., described with respect to FIGS. 1A and 1B are not intended to limit the systems and methods to the particular components described. Accordingly, additional topology configurations may be used to practice the methods and systems herein and/or some components described may be excluded without departing from the methods and systems disclosed herein.

Figure 2:
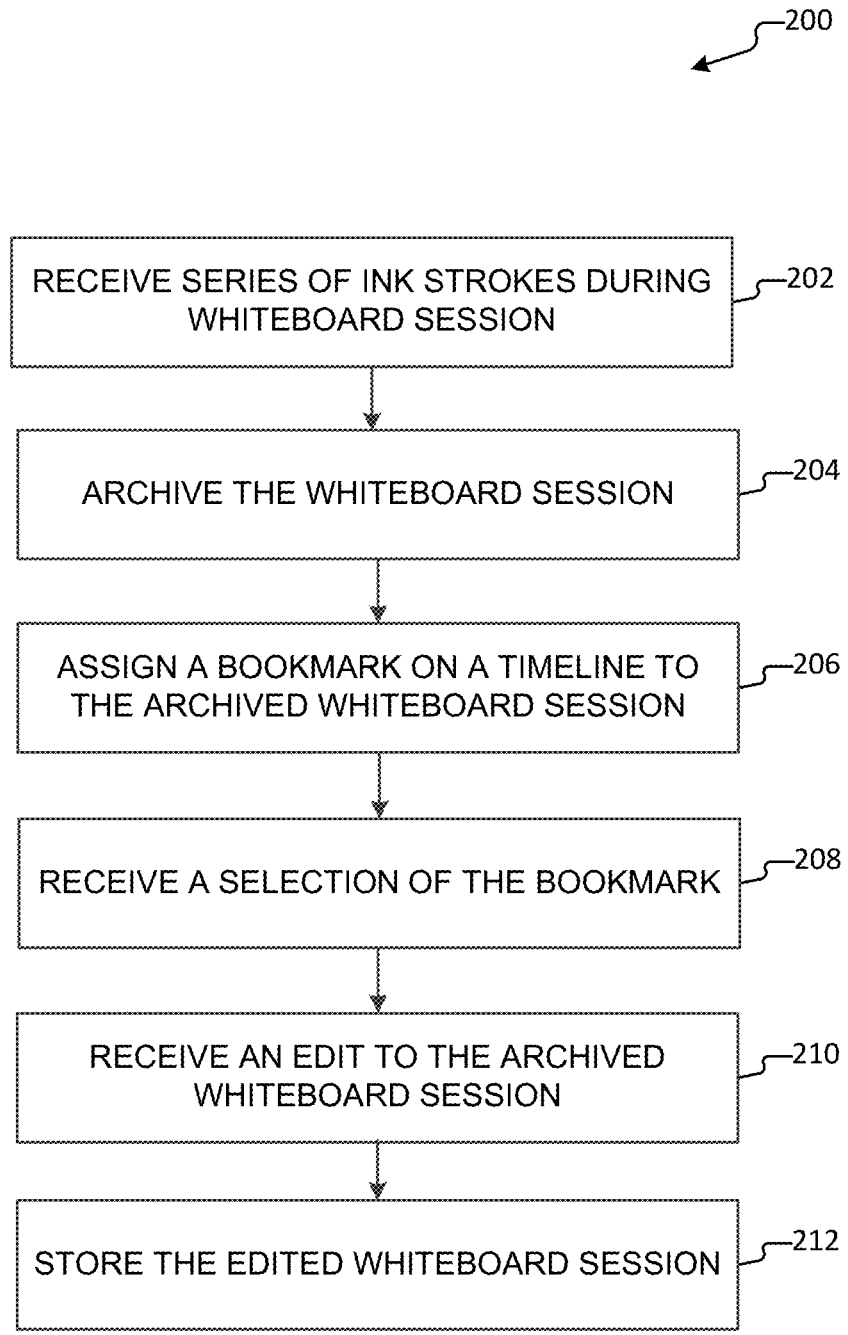
FIG. 2 illustrates a method for editing an archived whiteboard session associated with a timeline of an electronic whiteboard, according to an example embodiment.

FIG. 2 illustrates a method for editing an archived whiteboard session associated with a timeline of an electronic whiteboard, according to an example embodiment.

Method 200 begins with receive operation 202, where a whiteboard timeline manager such as whiteboard timeline manager 110 (or an electronic whiteboard in communication with the whiteboard timeline manager 110) may receive one or more ink strokes (e.g., via an ink stroke receiver 112) on an electronic whiteboard. As described above, an ink stroke may refer to any input on an electronic whiteboard, including a drawing input, a keystroke input, a click input, swipe input, etc., which may be received via touch, stylus, keyboard, mouse, gesture, etc. In aspects, the one or more ink strokes may be received in a series (e.g., in a sequential ordering) over time. In further aspects, each ink stroke may be associated with a timestamp or other temporal indicator when it is received. That is, each ink stroke may be associated with a sequential ordering within a series of ink strokes according to the order in which the ink stroke was received by the electronic whiteboard. In some aspects, one or more ink strokes received at about the same or similar time may be grouped. In this case, the group of ink strokes may be assigned to the same sequential ordering within the series of ink strokes such that during playback of the archived whiteboard session, the group of ink strokes may be displayed at the same time.

At archive operation 204, a whiteboard timeline manager such as whiteboard timeline manager 110 may archive (or store) one or more ink strokes and/or a whiteboard session associated with a series of ink strokes (e.g., via an archiver 114). In aspects, the whiteboard session may be archived in response to an indication that the whiteboard session is complete. Indications of session completion may include, for instance, selection of a "save" control, selection of a "trash" control, a session timeout (e.g., a time period after an ink stroke during which no instrokes are received), etc. Archiving a whiteboard session may include archiving each sequential ink stroke within a series of ink strokes received over the period of time associated with the whiteboard session. In aspects, archiving an ink stroke includes archiving properties of the ink stroke, such as color, length, width, shape, etc., as well as an indication of the sequential ordering of the ink stroke within the series of ink strokes. An indication of the sequential ordering may include a relative indication (e.g., first, second, third) or an absolute indication (e.g., a timestamp). As should be appreciated, any suitable indication of sequential ordering may be utilized without departing from the present disclosure. In some aspects, e.g., in a collaborative electronic whiteboard environment, two or more ink strokes may be received at substantially the same time. In this case, the two or more ink strokes may be associated with substantially the same sequential ordering within the series of ink strokes for a whiteboard session.

At assign operation 206, a whiteboard timeline manager such as whiteboard timeline manager 110 may assign a bookmark along a whiteboard timeline (e.g., via a bookmark assignor 116) to the archived whiteboard session. As described above, one or more bookmarks corresponding to one or more archived whiteboard sessions may be ordered along a whiteboard timeline, whether ordered chronologically or by user-selection. In aspects, each bookmark may be associated with a bookmark name. The bookmark name may be automatically generated (e.g., based on a date and/or time associated with the archived whiteboard session) or may be assigned by a user.

At receive selection operation 208, a whiteboard timeline manager such as whiteboard timeline manager 110 may receive a selection of the bookmark corresponding to the archived whiteboard session. In some aspects, a bookmark may be selected by clicking or otherwise activating the bookmark. For instance, upon left clicking the bookmark, the archived whiteboard session assigned to the bookmark may be displayed on the electronic whiteboard. Alternatively, upon right clicking the bookmark, a menu for performing one or more actions may be displayed. For instance, the menu may provide options for editing a bookmark name, relocating a bookmark, editing the corresponding archived whiteboard session, and the like. In aspects, in response to selecting an option for editing the corresponding archived whiteboard session, the archived whiteboard session may be opened (or launched) in an editing mode.

At receive edit operation 210, a whiteboard timeline manager such as whiteboard timeline manager 110 may receive an edit to the archived one or more ink strokes and/or the archived whiteboard session (e.g., via edit receiver 118). For instance, when the archived whiteboard session is opened in an editing mode, an editing canvas may enable edits to ink strokes, addition of ink strokes, deletion of ink strokes, etc., associated with the archived whiteboard session. An edit may include any change to the series of ink strokes associated with the archived whiteboard session, e.g., a color change to an ink stroke, a width change to an ink stroke, a length change to an ink stroke, a shape change to an ink stroke, a full or partial deletion of an ink stroke, a full or partial replacement of an ink stroke, a new ink stroke, etc. In other cases, an edit to the archived whiteboard session may include reordering one or more ink strokes within the series of ink strokes. For instance, a reordered ink stroke may be manually reassigned to a different order (e.g., from third to fifth) or may be dragged to a different order and automatically reassigned a sequential ordering within the series of ink strokes. In some cases, e.g., if an edit is made to an existing ink stroke, the edited ink stroke may maintain its sequential order within the series of ink strokes. In other cases, e.g., if an edit involves a new ink stroke, the new ink stroke may be assigned a sequential order within the series of ink strokes (e.g., based on when it was received during edit mode, based on adjacent ink strokes, or otherwise). In still other cases, e.g., if the edit involves a deletion and replacement of an ink stroke, the replacement ink stroke may maintain the sequential order of the deleted ink stroke within the series of ink strokes.

At store operation 212, a whiteboard timeline manager such as whiteboard timeline manager 110 may store the edited one or more ink strokes and/or the edited whiteboard session (e.g. via an archiver 114 or other component). For example, edits to one or more ink strokes and/or edits to the ordering of one or more ink strokes may be saved as the edited whiteboard session. In some cases, the edited whiteboard session may be associated with the same bookmark as the archived whiteboard session, effectively overwriting the archived whiteboard session. In other cases, the edited whiteboard session may be associated with a different bookmark. In some cases, the bookmark associated with an edited whiteboard session may provide an indication that the whiteboard session has been edited. In other cases, the bookmark may provide no such indication. For instance, upon left clicking the bookmark, the edited whiteboard session assigned to the bookmark may be displayed on the electronic whiteboard. That is, the edited whiteboard session may be displayed (or "played") including the edits to the one or more ink strokes and/or the edits to the ordering of the one or more ink strokes associated with the edited whiteboard session. Additionally or alternatively, upon right clicking the bookmark, an edit mode may be launched and one or more additional edits may be made to the edited whiteboard session, as described above with respect to receive edit operation 210.

As should be appreciated, operations 202-212 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 3:
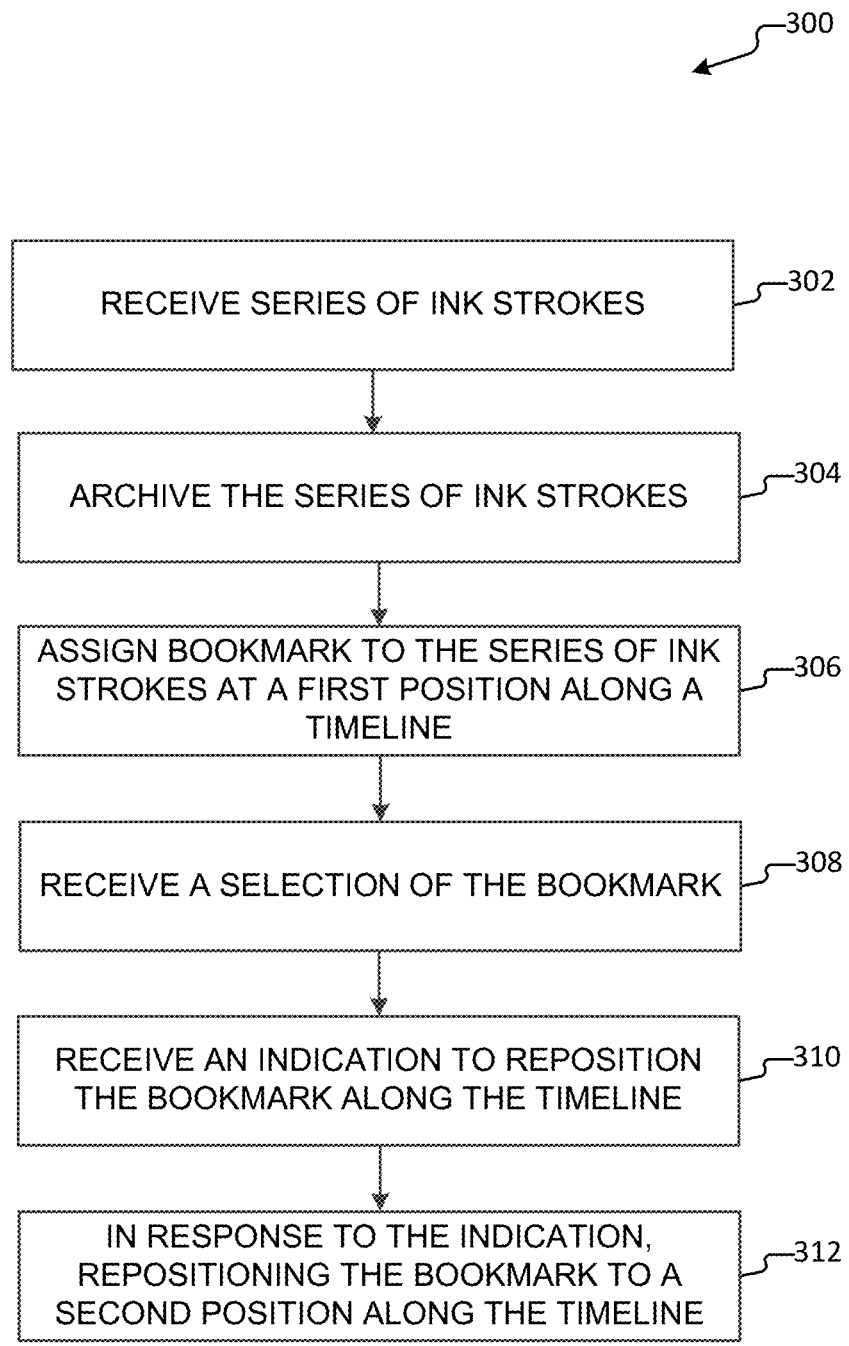
FIG. 3 illustrates a method for editing a position of a bookmark along a timeline of an electronic whiteboard, according to an example embodiment.

FIG. 3 illustrates a method for editing a position of a bookmark along a timeline of an electronic whiteboard, according to an example embodiment.

Method 300 begins with receive operation 302, as described above with respect to receive operation 202, where a whiteboard timeline manager such as whiteboard timeline manager 110 may receive one or more ink strokes (e.g., via an ink stroke receiver 112) on an electronic whiteboard. In some cases, the one or more ink strokes may be associated with a whiteboard session.

At archive operation 304, as described above with respect to archive operation 204, a whiteboard timeline manager such as whiteboard timeline manager 110 may archive (or store) the series of ink strokes (e.g., via an archiver 114).

At assign operation 306, a whiteboard timeline manager such as whiteboard timeline manager 110 may assign a bookmark to the archived series of ink strokes at a first position along a whiteboard timeline. The first position of the bookmark corresponding to the archived series of ink strokes may be assigned based on a chronologically of the archived series of ink strokes, based on a topic of the archived series of ink strokes, based on a bookmark name associated with the bookmark (e.g., alphabetically), by user-selection, or otherwise.

At receive selection operation 308, as described above with respect to receive selection operation 208, a whiteboard timeline manager such as whiteboard timeline manager 110 may receive a selection of the bookmark corresponding to the archived series of ink strokes. As described above, upon selecting the bookmark, a menu for performing one or more actions may be displayed. For instance, the menu may provide options for editing a bookmark name, repositioning a bookmark, editing the corresponding archived series of ink strokes, and the like. In aspects, in response to selecting an option for repositioning the bookmark along the timeline, the bookmark may become movable along the whiteboard timeline.

At receive indication operation 310, a whiteboard timeline manager such as whiteboard timeline manager 110 may receive an indication to reposition the bookmark along the whiteboard timeline (e.g., via edit receiver 118). For instance, upon selection of an option to reposition the bookmark, the bookmark may become movable along the whiteboard timeline. The indication to reposition the bookmark may include clicking and dragging the bookmark, touching and sliding the bookmark, or otherwise.

At reposition operation 312, in response to the indication to reposition the bookmark, a whiteboard timeline manager such as whiteboard timeline manager 110 may reposition the bookmark to a second position along the whiteboard timeline. In aspects the second position may be different than the first position and may fall before (e.g., to the left) or after (e.g., to the right) the first position along the whiteboard timeline. In some aspects, a second archived series of ink strokes may be associated with a second bookmark along the whiteboard timeline. Further, the second archived series of ink strokes may have occurred after the archived session in time. Even so, after repositioning the bookmark, the second bookmark associated with the second archived series of ink strokes may be positioned before the second position of the bookmark along the timeline. In further aspects, in response to repositioning the bookmark from the first position to the second position, the bookmark may be renamed, either automatically or by user selection.

As should be appreciated, operations 302-312 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 4:
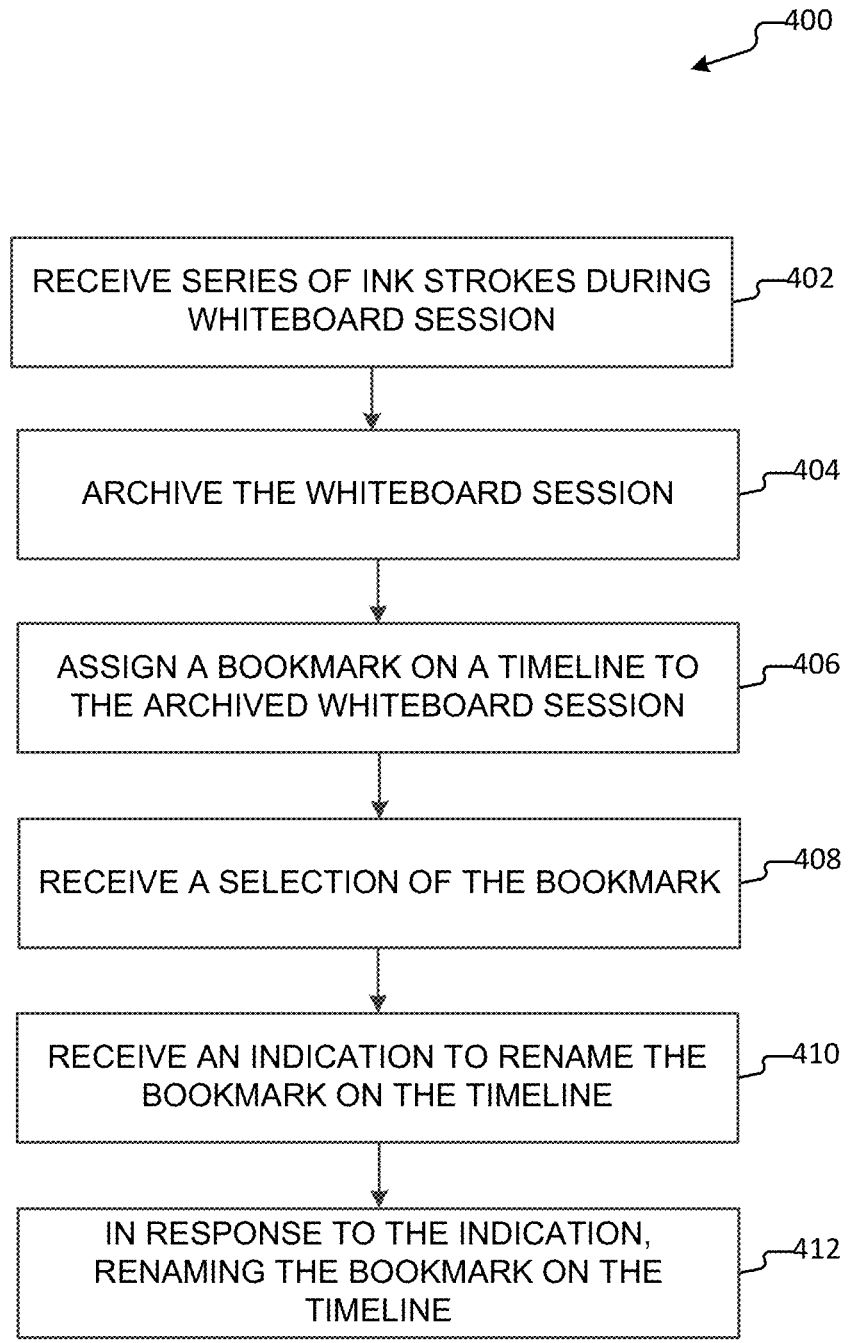
FIG. 4 illustrates a method for editing a bookmark name of a bookmark along a timeline of an electronic whiteboard, according to an example embodiment.

FIG. 4 illustrates a method for editing a bookmark name of a bookmark along a timeline of an electronic whiteboard, according to an example embodiment.

Method 400 begins with receive operation 402, as described above with respect to receive operation 202, where a whiteboard timeline manager such as whiteboard timeline manager 110 may receive one or more ink strokes (e.g., via an ink stroke receiver 112) on an electronic whiteboard.

At archive operation 404, as described above with respect to archive operation 204, a whiteboard timeline manager such as whiteboard timeline manager 110 may archive (or store) a whiteboard session associated with the series of ink strokes (e.g., via an archiver 114).

At assign operation 406, as described above with respect to assign operation 206, a whiteboard timeline manager such as whiteboard timeline manager 110 may assign a bookmark along a whiteboard timeline (e.g., via a bookmark assignor 116) to the archived whiteboard session.

At receive selection operation 408, as described above with respect to receive selection operation 208, a whiteboard timeline manager such as whiteboard timeline manager 110 may receive a selection of the bookmark corresponding to the archived whiteboard session. As described above, upon selecting the bookmark, a menu for performing one or more actions may be displayed. For instance, the menu may provide options for editing a bookmark name, repositioning a bookmark, editing the corresponding archived whiteboard session, and the like. In aspects, in response to selecting an option for editing a bookmark name, the bookmark name may become editable.

At receive indication operation 410, a whiteboard timeline manager such as whiteboard timeline manager 110 may receive an indication to rename the bookmark (e.g., via edit receiver 118). For instance, upon selection of an option to edit the bookmark name, the bookmark name may become editable. The indication to rename the bookmark may include right clicking on the bookmark name, touching the bookmark name, or otherwise.

At rename operation 412, in response to the indication to rename the bookmark, a whiteboard timeline manager such as whiteboard timeline manager 110 may receive an edit to the bookmark name. In aspects, renaming the bookmark may include partially or fully replacing the bookmark name. In further aspects, receiving one or more edits to an archived whiteboard session associated with the bookmark may automatically enable the bookmark name to become editable and/or automatically rename the bookmark (e.g., to include an indication that the bookmark is associated with an edited whiteboard session). In this case, the indication to rename the bookmark may be receipt of the one or more edits to the corresponding archived whiteboard session. Additionally, in some aspects, an indication to reposition the renamed bookmark from a first position to a second position along the whiteboard timeline may be received.

As should be appreciated, operations 402-412 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 5A:
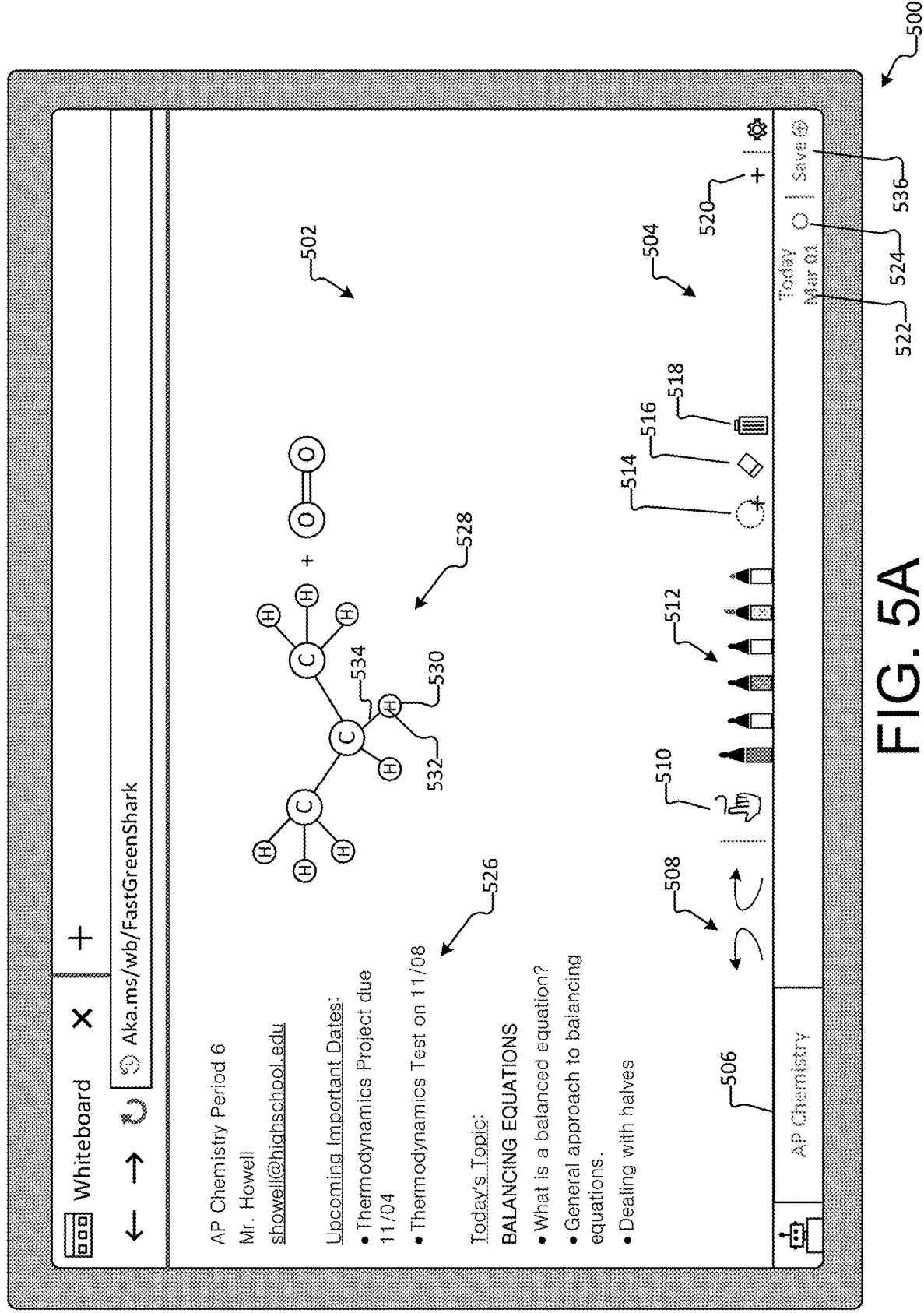

FIG. 5A illustrates a whiteboard interface displaying a series of ink strokes received during a whiteboard session over time, according to an example embodiment.

As illustrated, an interface 500 of an electronic whiteboard is provided. In aspects, the electronic whiteboard may include a single device or multiple devices (e.g., multiple interactive tiles) in coordination to form the interface. Interface 500 includes drawing canvas 502 and a toolbar 504. Drawing canvas 502 may be configured to receive various types of input, e.g., touch input, mouse input, keyboard input, stylus input, etc. Input onto the drawing canvas 502 may result in one or more ink strokes being displayed on the electronic whiteboard interface 500. For instance, each input may result in an ink stroke, which may correspond to a line, a shape, an alphanumeric letter or number, a graphic, etc. For example, ink stroke 530 corresponds to a shape (i.e., a circle), ink stroke 532 corresponds to an alphanumeric letter (i.e., the letter "H") and ink stroke 534 corresponds to a line. In some cases, a plurality of ink strokes received at substantially the same or similar time may be grouped together. As illustrated, drawing canvas 502 displays a plurality of ink strokes 526, which correspond to alphanumeric text, and a plurality of ink strokes 528, which includes a first grouping of ink strokes forming a first chemical structure and a second grouping of ink strokes forming a second chemical structure.

Toolbar 504 may include a number of controls for interacting with the electronic whiteboard interface. For example, toolbar 504 may include a text field 506 for receiving a topic or title associated with a whiteboard session. Undo/redo controls 508 may be provided for deleting an immediately prior ink stroke (e.g., "undo") or replacing the immediately prior deleted ink stroke (e.g., "redo"). Touch control 510 may enable the drawing canvas to enter a "fingerpainting mode" for receiving touch input. Drawing controls 512 may allow for selection of different colored pens and brushes for freehand input of ink strokes on the drawing canvas. Lasso control 514 may allow for selection of a group of objects (ink, pictures, etc.) in order to manipulate the group (e.g., move, resize, delete, copy, cut, etc.). Eraser control 516 may allow for partially or fully deleting one or more ink strokes. Trash control 518 may allow a current drawing canvas associated with a whiteboard session to be discarded. In some aspects, in response to receiving a selection of trash control 518, the whiteboard session may automatically be saved (or archived) and associated with a bookmark along a whiteboard timeline. Insert control 520 may enable an additional page to be added to the whiteboard session and/or may pan the viewable display area to the right or to the left to provide an additional drawing area within the drawing canvas.

Additional functionality may include a date field 522, which may display the current date and/or time associated with a current whiteboard session (e.g., "March 1"), or may display the historical date and/or time associated with an archived whiteboard session (not shown). Additionally, one or more bookmarks may be provided along a timeline associated with toolbar 504. In the illustrated case, the current whiteboard session is the first whiteboard session to be recorded by the electronic whiteboard. Thus, a "timeline" has not yet been created within the tool bar and a single bookmark 524 is shown as an open circle. The bookmark 524 is shown as an open circle to indicate that bookmark 524 is "selected" and is associated with the whiteboard session that is currently being displayed. In contrast, a bookmark illustrated as a closed circle (not shown) may indicate an "unselected" bookmark that is associated with an archived whiteboard session. As should be appreciated, other bookmark designations may be utilized without departing from the present disclosure, e.g., a pin icon, teardrop icon, star icon, etc., as well as other designations for a "selected" bookmark (e.g., highlighting, enlarging, etc., of the associated bookmark designation). Selection of a save control 536 may archive the currently displayed whiteboard session and, in some cases, automatically associate the archived whiteboard session with a bookmark along a whiteboard timeline.

Figure 5B:
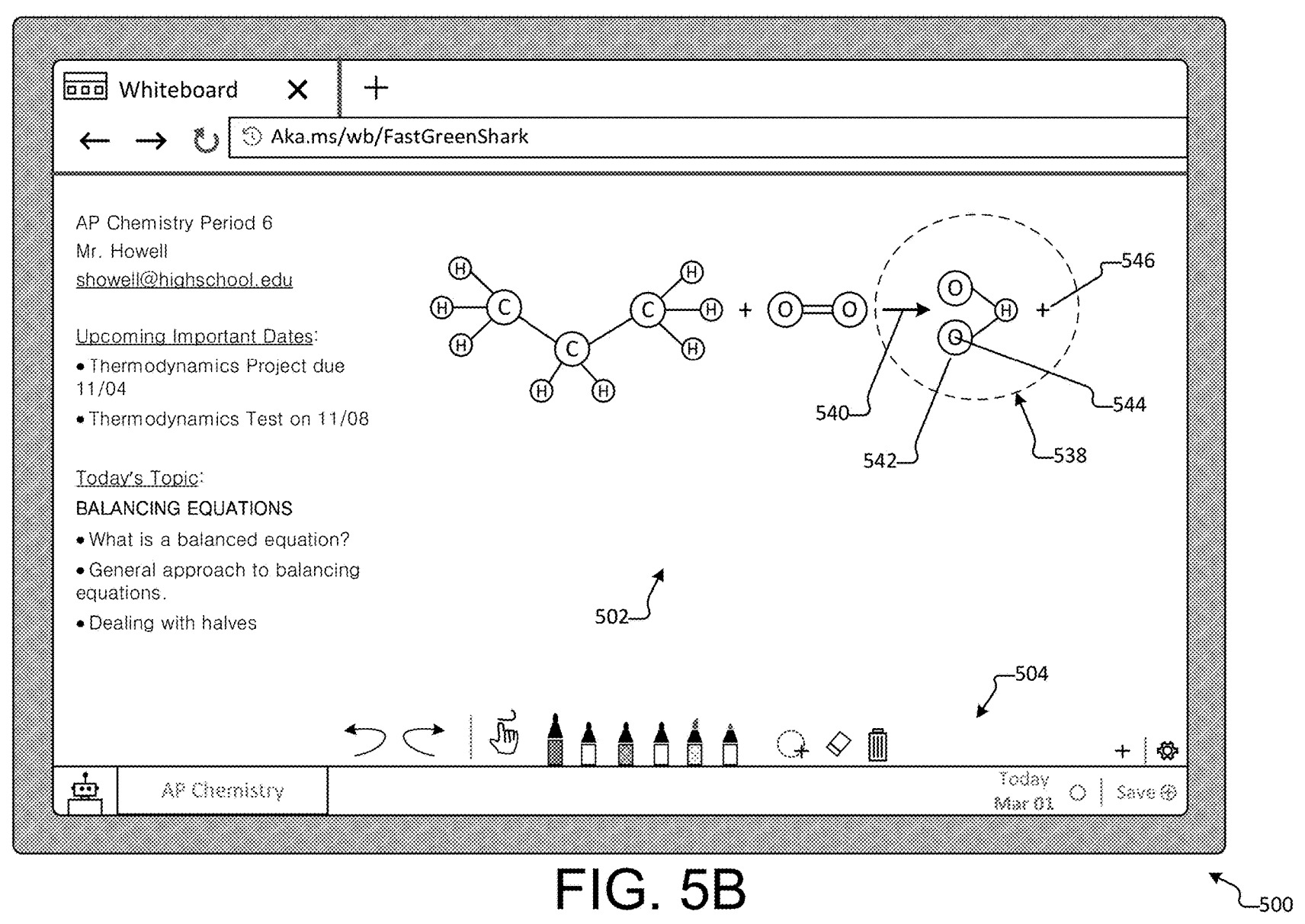

FIG. 5B illustrates a whiteboard interface displaying additional ink strokes received within a series of ink strokes during a whiteboard session over time, according to an example embodiment.

Similar to FIG. 5A, FIG. 5B illustrates interface 500 of an electronic whiteboard. Interface 500 includes drawing canvas 502 and a toolbar 504. As described above, drawing canvas 502 may be configured to receive various types of input, e.g., touch input, mouse input, keyboard input, stylus input, etc. For instance, in comparison to FIG. 5A, FIG. 5B illustrates additional input that resulted in additional ink strokes 538 (identified by the dashed circle). For example, ink stroke 540 corresponds to an arrow, ink stroke 542 corresponds to a shape (i.e., a circle), ink stroke 544 corresponds to an alphanumeric letter (i.e., the letter "O") and ink stroke 546 corresponds to an addition operator (i.e., "+").

Figure 5C:
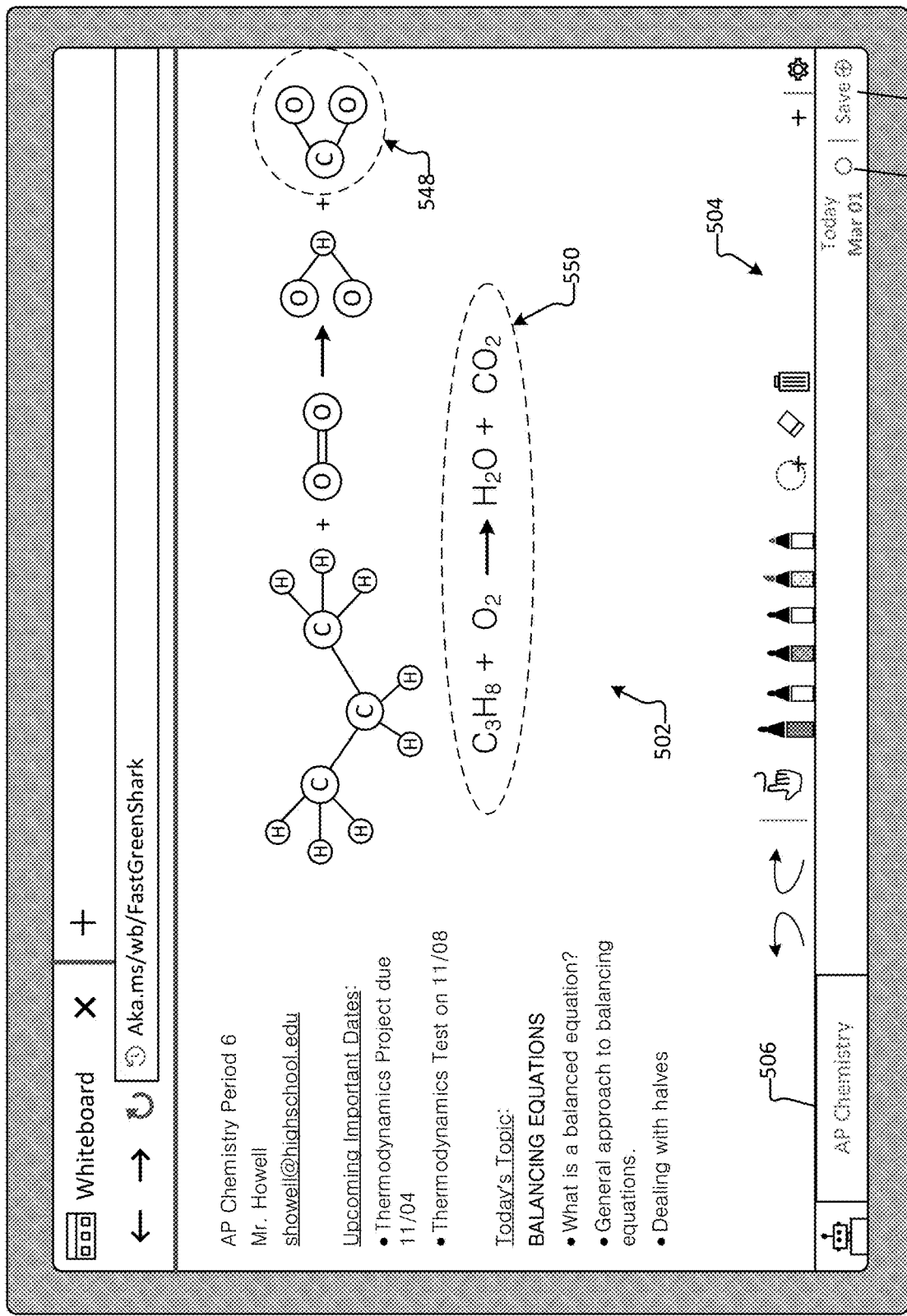

FIG. 5C illustrates a whiteboard interface displaying additional ink strokes received within a series of ink strokes during a whiteboard session over time, according to an example embodiment.

Similar to FIGS. 5A-5B, FIG. 5C illustrates interface 500 of an electronic whiteboard. Interface 500 includes drawing canvas 502 and a toolbar 504. As described above, drawing canvas 502 may be configured to receive various types of input, e.g., touch input, mouse input, keyboard input, stylus input, etc. For instance, in comparison to FIGS. 5A and 5B, FIG. 5C illustrates additional input that resulted in additional ink strokes 548 and additional ink strokes 550 (identified by the dashed circles). In aspects, additional ink strokes 548 combine to form a chemical structure and additional ink strokes 550 combine to form a chemical formula. For example, FIGS. 5A-5C may illustrate an AP Chemistry lesson, as indicated by text field 506. At the end of the class period, for example, the teacher may select save control 536 to save (or archive) the whiteboard session associated with the AP Chemistry lesson. In aspects, in response to archiving the whiteboard session, the archived whiteboard session may automatically be associated with a bookmark, e.g., bookmark 524, along a whiteboard timeline.

As should be appreciated, the various methods, devices, components, etc., described with respect to FIGS. 5A-5C are not intended to limit the systems and methods to the particular components described. Accordingly, additional topology configurations may be used to practice the methods and systems herein and/or some components described may be excluded without departing from the methods and systems disclosed herein.

FIG. 6A illustrates a toolbar of a whiteboard interface including an editable timeline, according to an example embodiment.

As illustrated, a toolbar 600 of a whiteboard interface is provided. Toolbar 600 may be similar to toolbar 504 of FIGS. 5A-5C. In contrast to toolbar 504, however, toolbar 600 displays a timeline 602 with a plurality of bookmarks (identified by closed circles). As illustrated, the current date (designated as "Today") is June 12. As illustrated, bookmark 606 is assigned a bookmark name 608 (i.e., "March 1"). In this case, the bookmark name 608 is the date that an archived whiteboard session was recorded by the electronic whiteboard. In other cases, a bookmark name may be an automatically-generated topic or title for the archived whiteboard session (e.g., retrieved from text field 506 of FIG. 5A), may be selected by a user, or may be otherwise assigned.

FIG. 6B illustrates a popup menu associated with an editable timeline of a whiteboard interface, according to an example embodiment.

As illustrated, a toolbar 600 of a whiteboard interface is provided. As described above, toolbar 600 displays a timeline 602 with a plurality of bookmarks. In this case, bookmark 606 has been selected (as indicated by an open circle). As described above, when a bookmark is selected (e.g., by left click), an archived whiteboard session associated with the selected bookmark may be displayed in the whiteboard interface. Additionally or alternatively, when a bookmark is selected (e.g., by right click), a popup menu 610 may be displayed. Popup menu 610 may provide a number of options for performing one or more actions. For instance, popup menu 610 may provide options for renaming the selected bookmark, relocating the selected bookmark, copying a session to a content library (e.g., another application such as Microsoft® OneNote®), editing the corresponding whiteboard session, etc. As should be appreciated, more or fewer options for performing actions may be provided for selection via a popup menu without departing from the present disclosure. As illustrated, the option for editing a whiteboard session associated with the selected bookmark has been selected on popup menu 610 (as indicated by shading).

As should be appreciated, the various methods, devices, components, etc., described with respect to FIGS. 6A-6B are not intended to limit the systems and methods to the particular components described. Accordingly, additional topology configurations may be used to practice the methods and systems herein and/or some components described may be excluded without departing from the methods and systems disclosed herein.

Figure 7A:
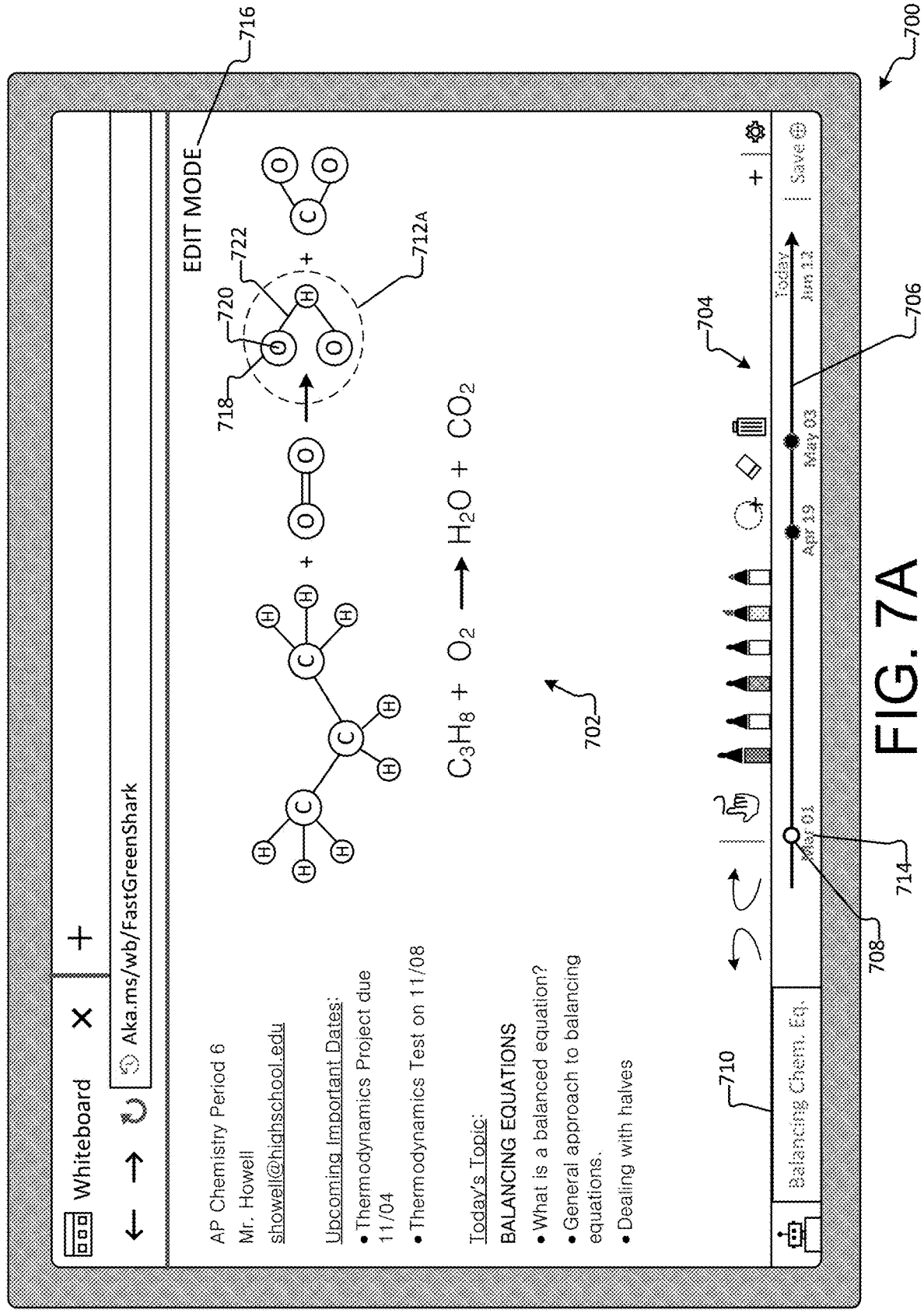
FIGS. 7A-7D illustrate a whiteboard interface for editing at least one ink stroke of an archived whiteboard session, according to an example embodiment.

FIG. 7A illustrates a whiteboard interface for editing at least one ink stroke of an archived whiteboard session, according to an example embodiment.

As illustrated, an interface 700 of an electronic whiteboard is provided. Interface 700 includes drawing canvas 702 and a toolbar 704. In contrast to interface 500 of FIGS. 5A-5C, which displays a current whiteboard session as it is being recorded, interface 700 displays an archived whiteboard session. As illustrated, the archived whiteboard session illustrated by FIG. 7A corresponds to the whiteboard session that was completed and saved on "March 1," as illustrated by FIG. 5C. In this case, bookmark 708 along timeline 706 corresponds to the archived whiteboard session stored on March 1 (as evidenced by bookmark name 714). As illustrated, bookmark 708 has been selected (as indicated by an open circle). Text field 710 indicates that the archived whiteboard session is entitled "Balancing Chem. Eq."

As illustrated, interface 700 has been opened in an "edit mode," as indicated by prompt 716. As described above, when a bookmark is selected, an archived whiteboard session may either be viewed and/or edited. In one aspect, whenever an archived whiteboard session is viewed it may also be edited. In another aspect, an archived whiteboard session may opened in either a view mode (e.g., read only) or an edit mode (read and/or write). As described with reference to FIGS. 6A and 6B, when a bookmark is selected (e.g., right click), a menu displaying one or more options for performing one or more actions may be displayed. The options may include, for instance, renaming the selected bookmark, relocating the selected bookmark, editing the corresponding whiteboard session, etc. In aspects, when the option for editing the corresponding whiteboard session is selected, interface 700 may enter an edit mode. In some cases, as illustrated, when the interface is in edit mode a prompt 716 may be displayed. In other cases, the edit mode may be signified by italicizing or otherwise indicating activation of the one or more ink strokes associated with the whiteboard session (not shown).

For example, referring back to the example regarding the chemistry lesson, a teacher may present a whiteboard session regarding a particular topic (e.g., Balancing Equations) during a particular period (e.g., Period 6) of a particular day (e.g., March 1). Later, the teacher may wish to "play" the whiteboard session for another class, as part of the curriculum for the following year, etc. Similarly, students may wish to "play" the whiteboard session if they missed the class, in preparation for a test, etc. In some cases, when a teacher later reviews an archived whiteboard session, the teacher may wish to add content (e.g., new content may have become available), delete content (e.g., content may no longer be relevant, content may be covered in a different unit, etc.) and/or change content (content may have changed since it was originally presented, errors may be detected, etc.). For instance, a teacher may later realize that an error was made during the original presentation of the whiteboard session. As illustrated, the teacher may later realize that the ink strokes 712A (identified by a dashed circle) forming the chemical structure for water ($H_2O$) were incorrectly drawn during the original whiteboard session. As illustrated, ink strokes 712A include, at least, ink stroke 718 (a circle shape), ink stroke 720 (letter "O") and ink stroke 722 (a line). In this case, the teacher may wish to edit the archived whiteboard session.

Figure 7B:
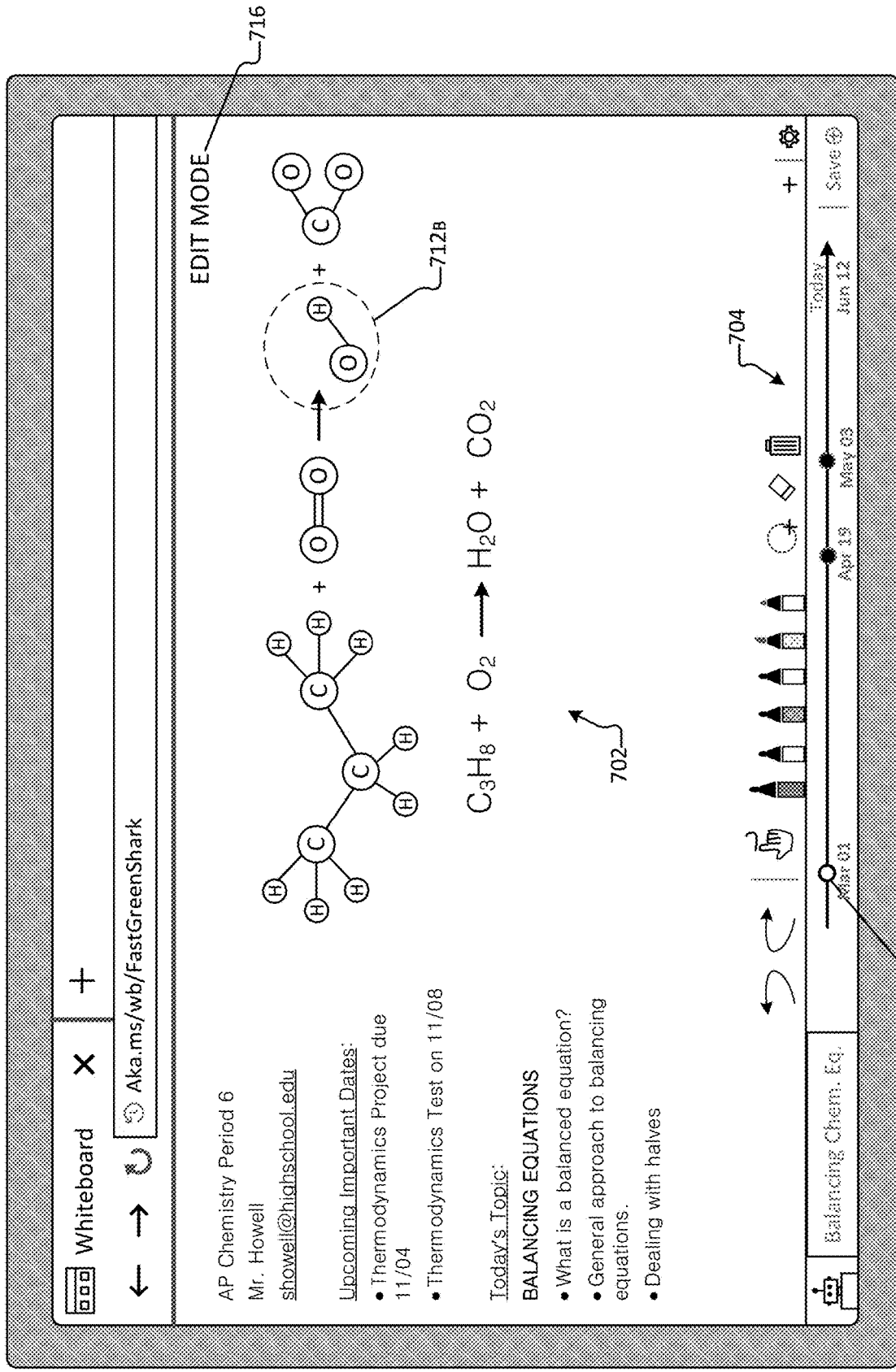

FIG. 7B illustrates a whiteboard interface for deleting at least one ink stroke of an archived whiteboard session, according to an example embodiment.

Similar to FIG. 7A, FIG. 7B illustrates an interface 700 of an electronic whiteboard including a drawing canvas 702 and a toolbar 704. Prompt 716 indicates that an archived whiteboard session associated with selected bookmark 708 has been opened in "edit mode." Additionally, FIG. 7B illustrates that some of the ink strokes 712B have been deleted. That is, ink stroke 718, ink stroke 720 and ink stroke 722 have been deleted.

Figure 7C:
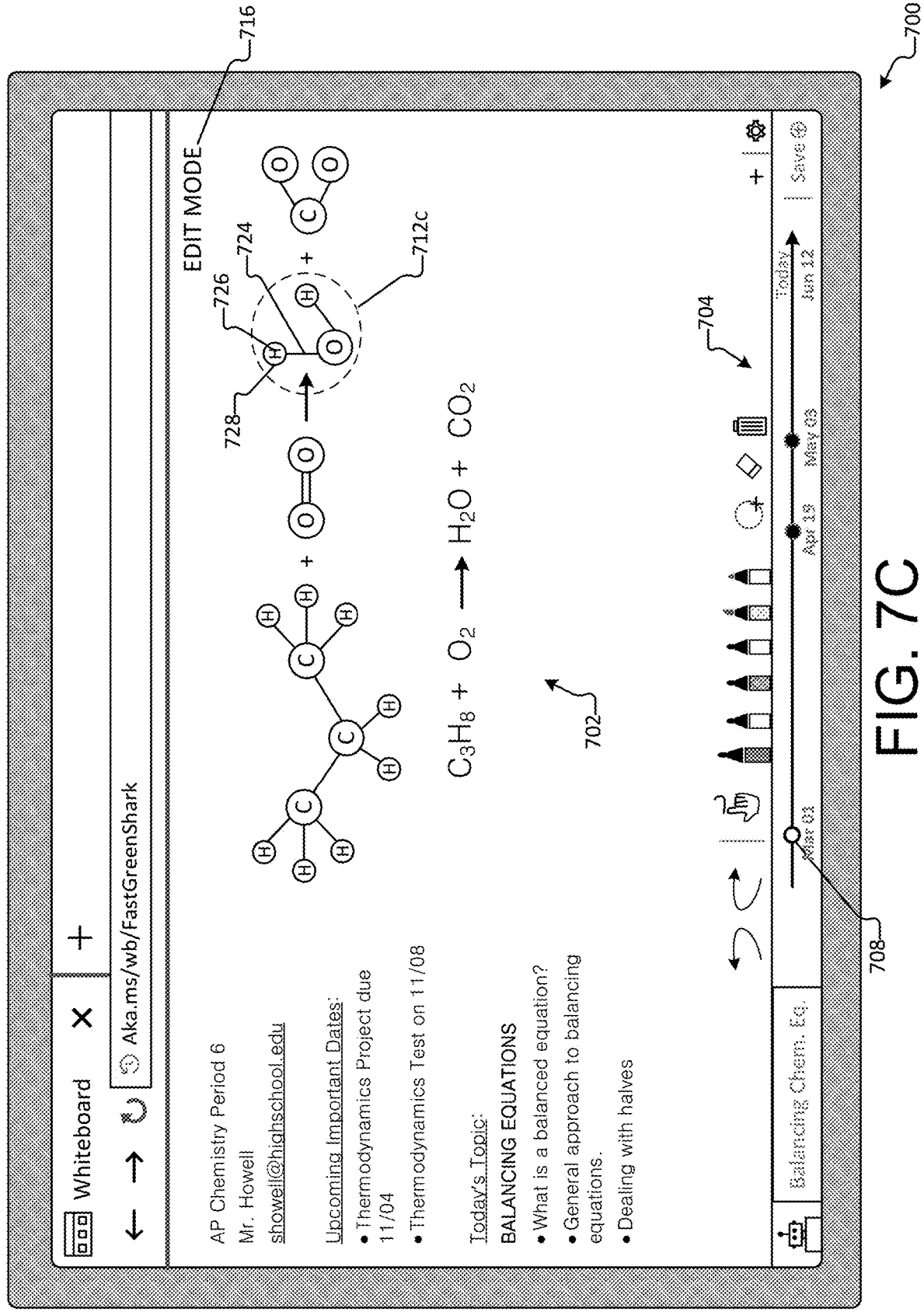

FIG. 7C illustrates a whiteboard interface for adding at least one ink stroke of an archived whiteboard session, according to an example embodiment.

Similar to FIGS. 7A-7B, FIG. 7C illustrates an interface 700 of an electronic whiteboard including a drawing canvas 702 and a toolbar 704. Prompt 716 indicates that an archived whiteboard session associated with selected bookmark 708 has been opened in "edit mode." Additionally, FIG. 7C illustrates that ink stroke 724 (a line), ink stroke 726 (a letter "H") and ink stroke 728 (a smaller circle shape) have been added to ink strokes 712C to form the chemical structure of water ($H_2O$).

Figure 7D:
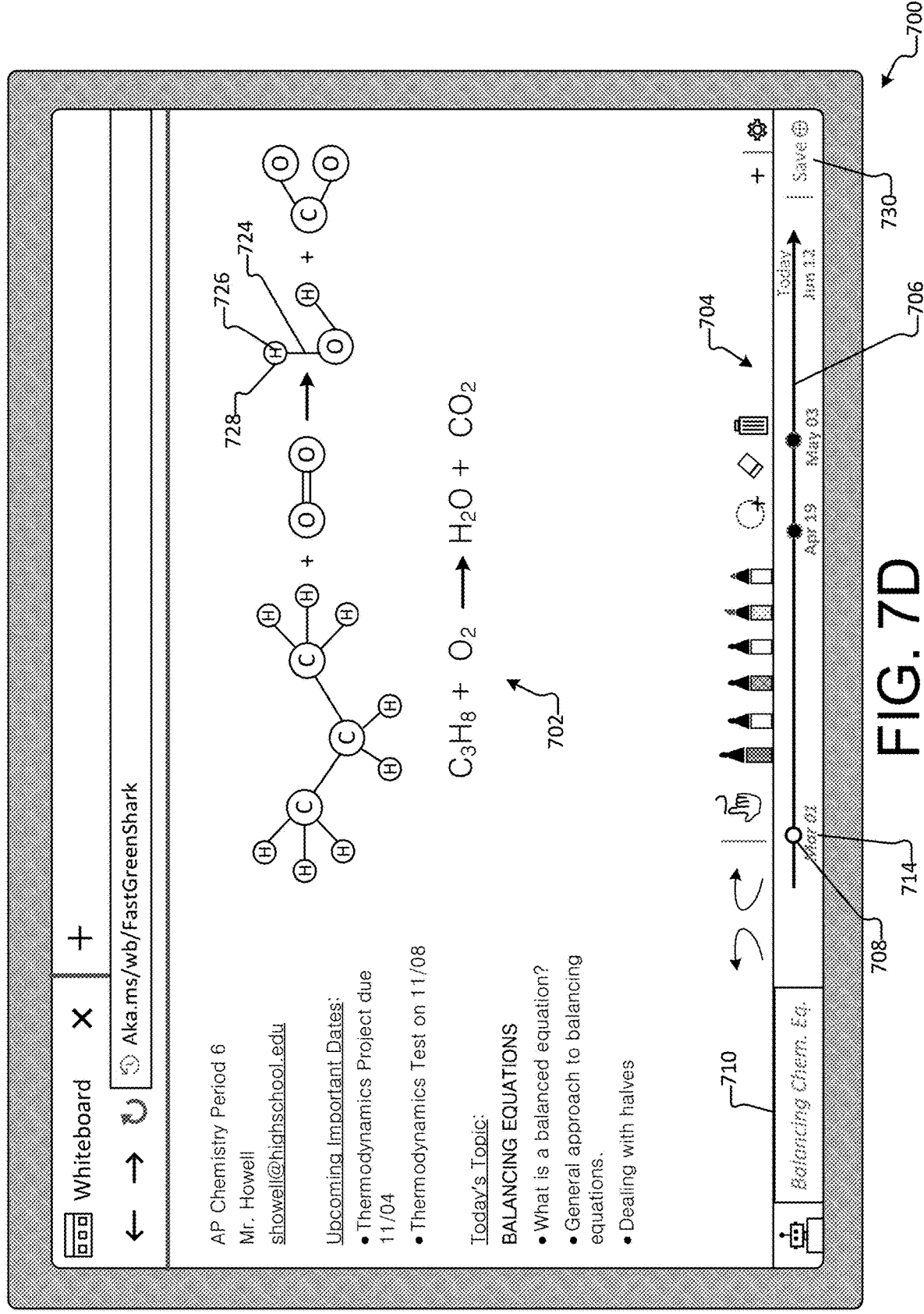

FIG. 7D illustrates a whiteboard interface for storing an edited whiteboard session, according to an example embodiment.

Similar to FIGS. 7A-7C, FIG. 7D illustrates an interface 700 of an electronic whiteboard including a drawing canvas 702 and a toolbar 704. In this case, save control 730 has been selected and the edited whiteboard session of FIG. 7C has been saved to the timeline 706. That is, the edited whiteboard session associated with selected bookmark 708 (identified by an open circle) includes ink stroke 724 (a line), ink stroke 726 (a letter "H"), and ink stroke 728 (a smaller circle shape) have been added to ink strokes 712C to form the chemical structure of water ($H_2O$). In the illustrated aspect, bookmark name 714 indicates that the displayed whiteboard session has been edited by italicized bookmark name "March 1." Additionally, text field 710 indicates that the displayed whiteboard session has been edited by italicized topic "Balancing Chem. Eq." In embodiments, one, both or neither of the bookmark name 714 and the topic in text field 710 may indicate that the displayed whiteboard session has been edited. In other aspects, other indications may indicate that the whiteboard session has been edited (e.g., a prompt similar to prompt 716 may display "Edited"). In still other aspects, no designation may be provided to indicate that a whiteboard session has been edited.

As should be appreciated, the various methods, devices, components, etc., described with respect to FIGS. 7A-7D are not intended to limit the systems and methods to the particular components described. Accordingly, additional topology configurations may be used to practice the methods and systems herein and/or some components described may be excluded without departing from the methods and systems disclosed herein.

FIG. 8A illustrates a menu for editing a bookmark name associated with a bookmark along a timeline of a whiteboard interface, according to an example embodiment.

FIG. 8A shows a toolbar 800 including a timeline 802. The timeline 802 includes a number of bookmarks including bookmark 806 with bookmark name 808A (i.e., "March 1"). As described above, when a bookmark is selected (e.g., by left click), an archived whiteboard session associated with the selected bookmark may be displayed in a whiteboard interface (not shown). Additionally or alternatively, when a bookmark is selected (e.g., by right click), a popup menu 804 may be displayed. Popup menu 804 may provide a number of options for performing one or more actions. For instance, popup menu 804 may provide options for renaming the selected bookmark, copying a session to a content library (e.g., another application such as Microsoft® OneNote®), relocating the selected bookmark, editing the corresponding whiteboard session, etc. As should be appreciated, more or fewer options for performing actions may be provided for selection via a popup menu without departing from the present disclosure. As illustrated, the option 810 for renaming the bookmark has been selected on popup menu 804 (as indicated by shading).

FIG. 8B illustrates editing a bookmark name associated with a bookmark along a timeline of a whiteboard interface, according to an example embodiment.

Similar to FIG. 8A, FIG. 8B shows a toolbar 800 including a timeline 802 with bookmark 806. In this case, input field 812 is provided and a new name (i.e., "Balancing Chem. Eq.") has been input for bookmark name 808B. Further, the new name has been provided in italics (i.e., "Balancing Chem. Eq.") to indicate that bookmark name 808B is being edited. In some aspects, a bookmark name may be edited without utilizing an input field and/or there may be no indication that the bookmark name is being edited. As should be appreciated, the toolbar 800 may enable editing of a bookmark name via any suitable means.

Figure 8C:
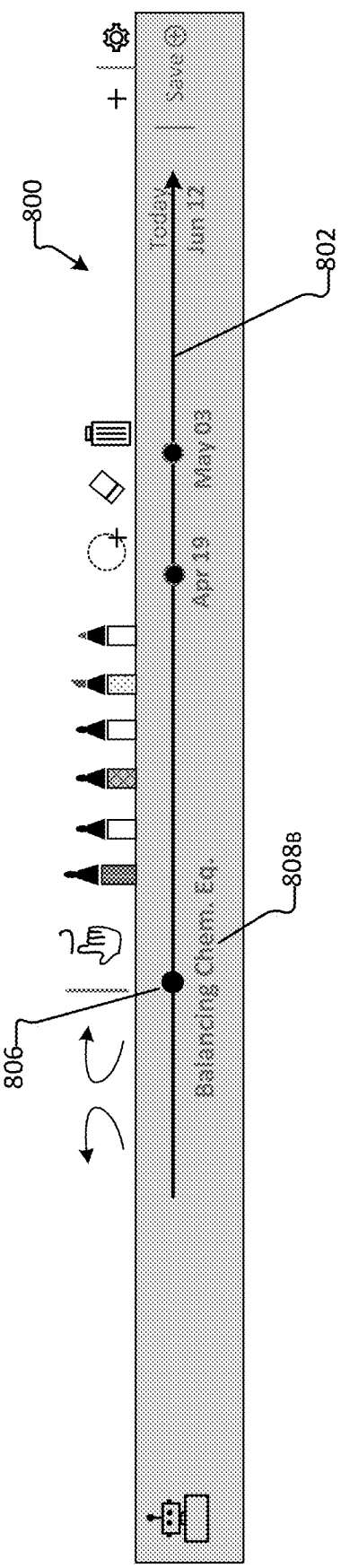

FIG. 8C illustrates an edited bookmark name associated with a bookmark along a timeline of a whiteboard interface, according to an example embodiment.

Similar to FIGS. 8A-8B, FIG. 8C shows a toolbar 800 including a timeline 802 with bookmark 806. In this case, the new bookmark name 808B (i.e., "Balancing Chem. Eq.") has been applied to bookmark 806 (indicated by removal of the input field and conforming font color). In some cases, when a bookmark name has been edited, an indication (such as italics or alternative font color) may be provided in conjunction with the edited bookmark name. In other cases, no such indication may be provided.

As should be appreciated, the various methods, devices, components, etc., described with respect to FIGS. 8A-8C are not intended to limit the systems and methods to the particular components described. Accordingly, additional topology configurations may be used to practice the methods and systems herein and/or some components described may be excluded without departing from the methods and systems disclosed herein.

Figure 9A:
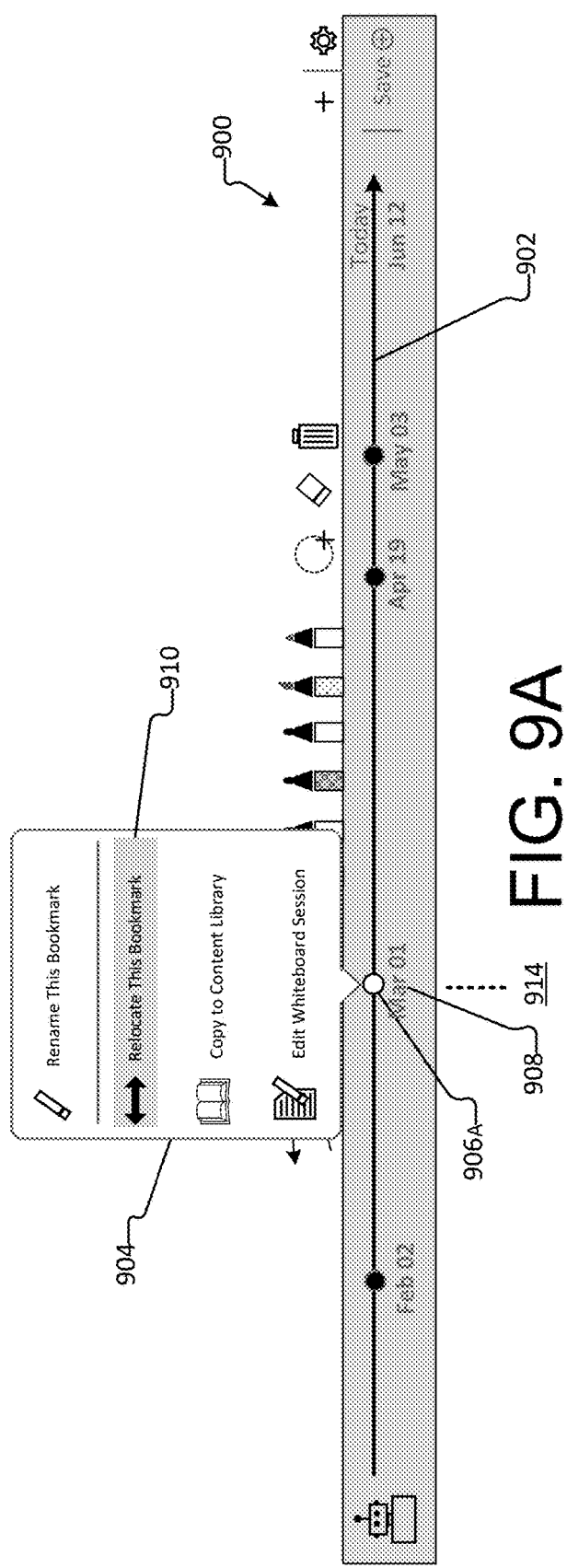
FIGS. 9A-9C illustrate a toolbar for relocating a bookmark along a timeline of a whiteboard interface, according to an example embodiment.

FIG. 9A illustrates a menu associated with a toolbar for relocating a bookmark along a timeline of a whiteboard interface, according to an example embodiment.

FIG. 9A shows a toolbar 900 including a timeline 902. The timeline 902 includes a number of bookmarks including bookmark 906A with bookmark name 908 (e.g., "March 1") at a first position 914 along the timeline 902. As described above, when a bookmark is selected (e.g., by left click), an archived whiteboard session associated with the selected bookmark may be displayed in a whiteboard interface (not shown). Additionally or alternatively, when a bookmark is selected (e.g., by right click), a popup menu 904 may be displayed with a number of options for performing one or more actions. For instance, popup menu 904 may provide options for renaming the selected bookmark, relocating the selected bookmark, editing the corresponding whiteboard session, etc. As should be appreciated, more or fewer options for performing actions may be provided for selection via a popup menu without departing from the present disclosure. As illustrated, the option 910 for relocating the bookmark has been selected on popup menu 904 (as indicated by shading).

Figure 9B:
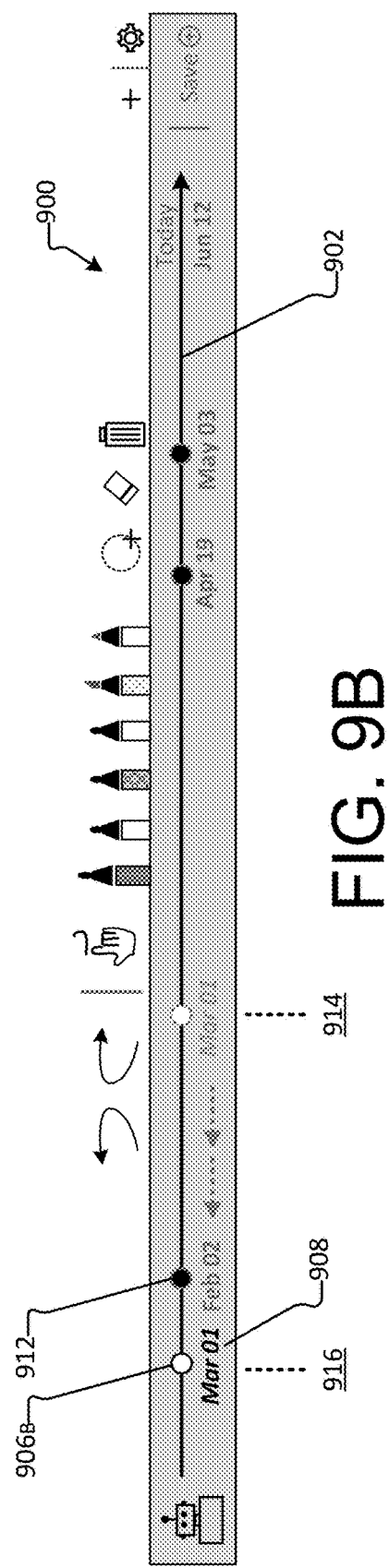

FIG. 9B illustrates relocating a bookmark along a timeline of a whiteboard interface, according to an example embodiment.

Similar to FIG. 9A, FIG. 9B shows a toolbar 900 including a timeline 902. In this case, bookmark 906B has been relocated from first position 914 to a second position 916 along timeline 902. That is, bookmark 906B has been moved to the left of (e.g., before) bookmark 912 along timeline 902. In aspects, bookmark 906B may have been dragged from the first position 914 to the second position 916, grabbed and dropped into the second position 916, copied and pasted to the second position 916, or otherwise. In aspects, upon selecting the option 910 to relocate the bookmark, the bookmark may be activated for repositioning it along timeline 902. In some cases, when a bookmark is active, an icon associated with the bookmark may indicate that it is active (e.g., open circle). As should be appreciated, the toolbar 900 may enable relocation of a bookmark from a first position 914 to a second position 916 along timeline 902 via any suitable means.

Figure 9C:
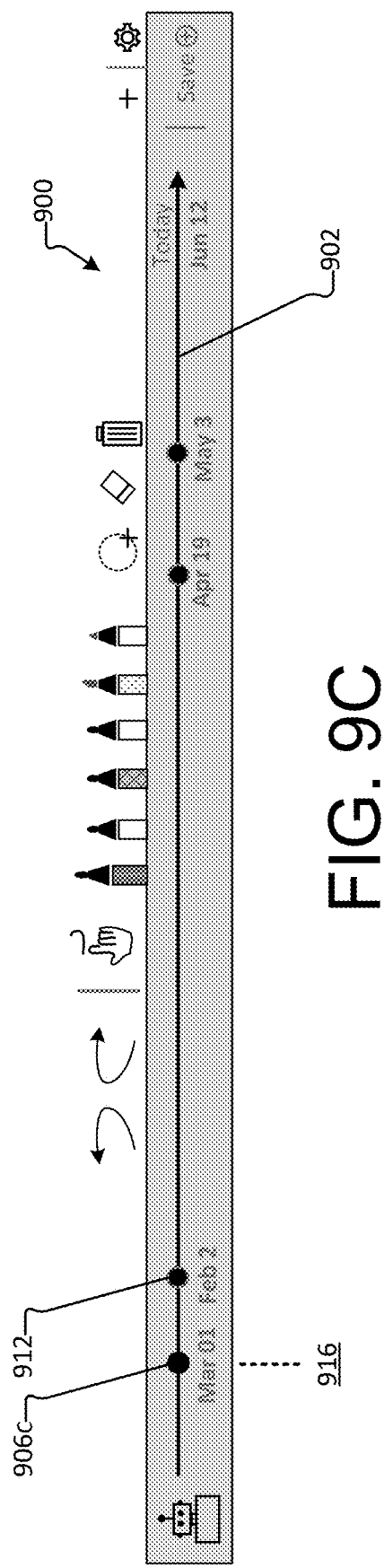

FIG. 9C illustrates a relocated bookmark along a timeline of a whiteboard interface, according to an example embodiment.

Similar to FIGS. 9A-9B, FIG. 9C shows a toolbar 900 including a timeline 902. As illustrated, bookmark 906C has been moved to a second location 916 along timeline 902. In this case, whereas the archived whiteboard session associated with bookmark 906C was recorded on March 1, the archived whiteboard session associated with bookmark 912 was recorded on February 2. That is, after relocating bookmark 906C, bookmark 906C is located to the left of (e.g., before) an earlier-recorded whiteboard session along timeline 902. Thus, bookmark 906C is no longer chronologically positioned with respect to other bookmarks (e.g., bookmark 912) along timeline 902. In this regard, based on user selection, bookmarks associated with archived whiteboard sessions may not necessarily be positioned chronologically along a timeline but may be positioned in any order based on user preference.

As should be appreciated, the various methods, devices, components, etc., described with respect to FIGS. 9A-9C are not intended to limit the systems and methods to the particular components described. Accordingly, additional topology configurations may be used to practice the methods and systems herein and/or some components described may be excluded without departing from the methods and systems disclosed herein.

FIGS. 10-13B and the associated descriptions provide a discussion of a variety of operating environments in which aspects of the disclosure may be practiced. However, the devices and systems illustrated and discussed with respect to FIGS. 10-13B are for purposes of example and illustration and are not limiting of a vast number of computing device configurations that may be utilized for practicing aspects of the disclosure, as described herein.

Figure 10:
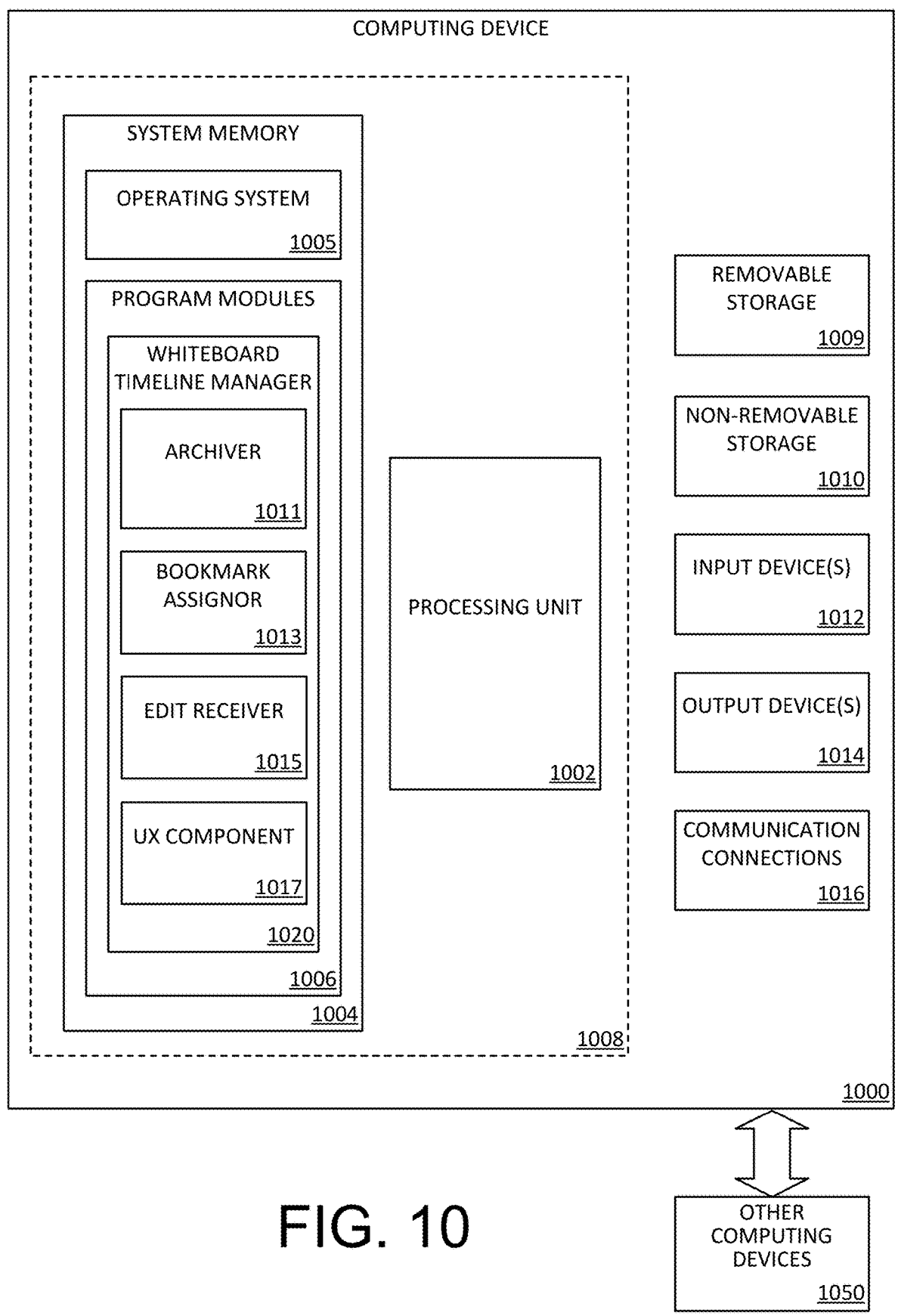
FIG. 10 is a block diagram illustrating example physical components of a computing device with which aspects of the disclosure may be practiced.

FIG. 10 is a block diagram illustrating physical components (e.g., hardware) of a computing device 1000 with which aspects of the disclosure may be practiced. The computing device components described below may have computer executable instructions for implementing a whiteboard timeline manager 1020 on a computing device (e.g., server computing device 108 and/or client computing device 104), including computer executable instructions for whiteboard timeline manager 1020 that can be executed to implement the methods disclosed herein. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1005 and one or more program modules 1006 suitable for running whiteboard timeline manager 1020, such as one or more components with regard to FIG. 1 and, in particular, archiver 1011 (e.g., including ink stroke receiver 112 and archiver 114), bookmark assignor 1013 (e.g., corresponding to bookmark assignor 116), edit receiver 1015 (e.g., corresponding to edit receiver 118), and/or UX component 1017 (e.g., corresponding to UX component 120).

The operating system 1005, for example, may be suitable for controlling the operation of the computing device 1000. Furthermore, embodiments of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., whiteboard timeline manager 1020) may perform processes including, but not limited to, the aspects, as described herein. Other program modules that may be used in accordance with aspects of the present disclosure, and in particular for creating and managing an editable timeline associated with an electronic whiteboard, may include archiver 1011, bookmark assignor 1013, edit receiver 1015, and/or UX component 1017, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media may be non-transitory media that does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
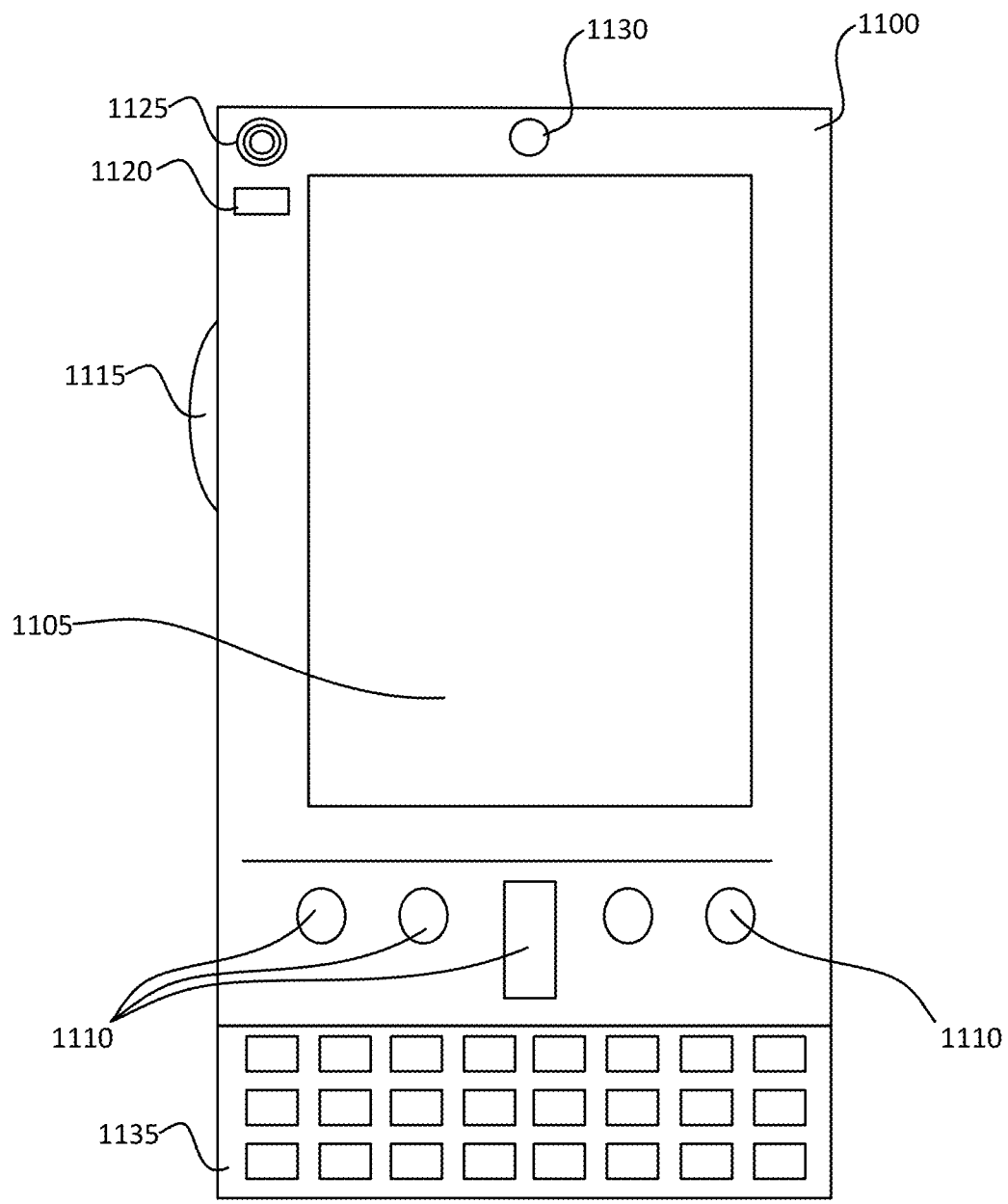
FIGS. 11A-11B are simplified block diagrams of a mobile computing device with which aspects of the present disclosure may be practiced.
Figure 11B:
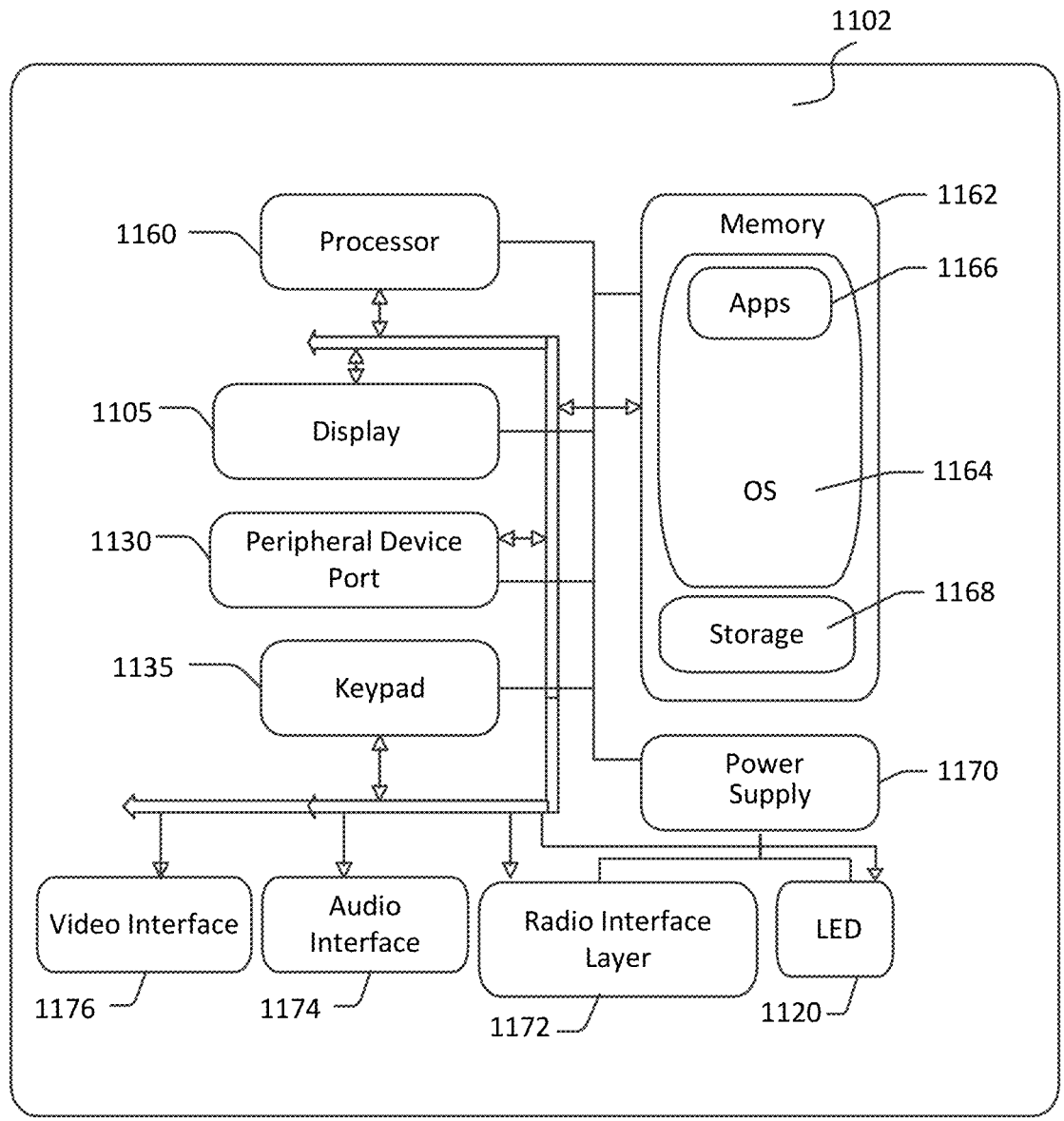

FIGS. 11A and 11B illustrate a mobile computing device 1100, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display). If included, an optional side input element 1115 allows further user input. The side input element 1115 may be a rotary switch, a button, or any other type of manual input element. In alternative aspects, mobile computing device 1100 may incorporate more or less input elements. For example, the display 1105 may not be a touch screen in some embodiments. In yet another alternative embodiment, the mobile computing device 1100 is a portable phone system, such as a cellular phone. The mobile computing device 1100 may also include an optional keypad 1135. Optional keypad 1135 may be a physical keypad or a "soft" keypad generated on the touch screen display. In various embodiments, the output elements include the display 1105 for showing a graphical user interface (GUI), a visual indicator 1120 (e.g., a light emitting diode), and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one aspect of a mobile computing device. That is, the mobile computing device 1100 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as email or other messages used by an email application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100, including the instructions for creating and managing an editable timeline associated with an electronic whiteboard as described herein (e.g., ink stroke receiver, session archiver, bookmark assignor, edit receiver and/or UX component, etc.).

The system 1102 has a power supply 1170, which may be implemented as one or more batteries. The power supply 1170 may further include an external power source, such as an AC adapter or a powered docking cradle that supplements or recharges the batteries. The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via an audio transducer 1125 (e.g., audio transducer 1125 illustrated in FIG. 11A). In the illustrated embodiment, the visual indicator 1120 is a light emitting diode (LED) and the audio transducer 1125 may be a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of peripheral device 1130 (e.g., on-board camera) to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

As should be appreciated, FIGS. 11A and 11B are described for purposes of illustrating the present methods and systems and are not intended to limit the disclosure to a particular sequence of steps or a particular combination of hardware or software components.

Figure 12:
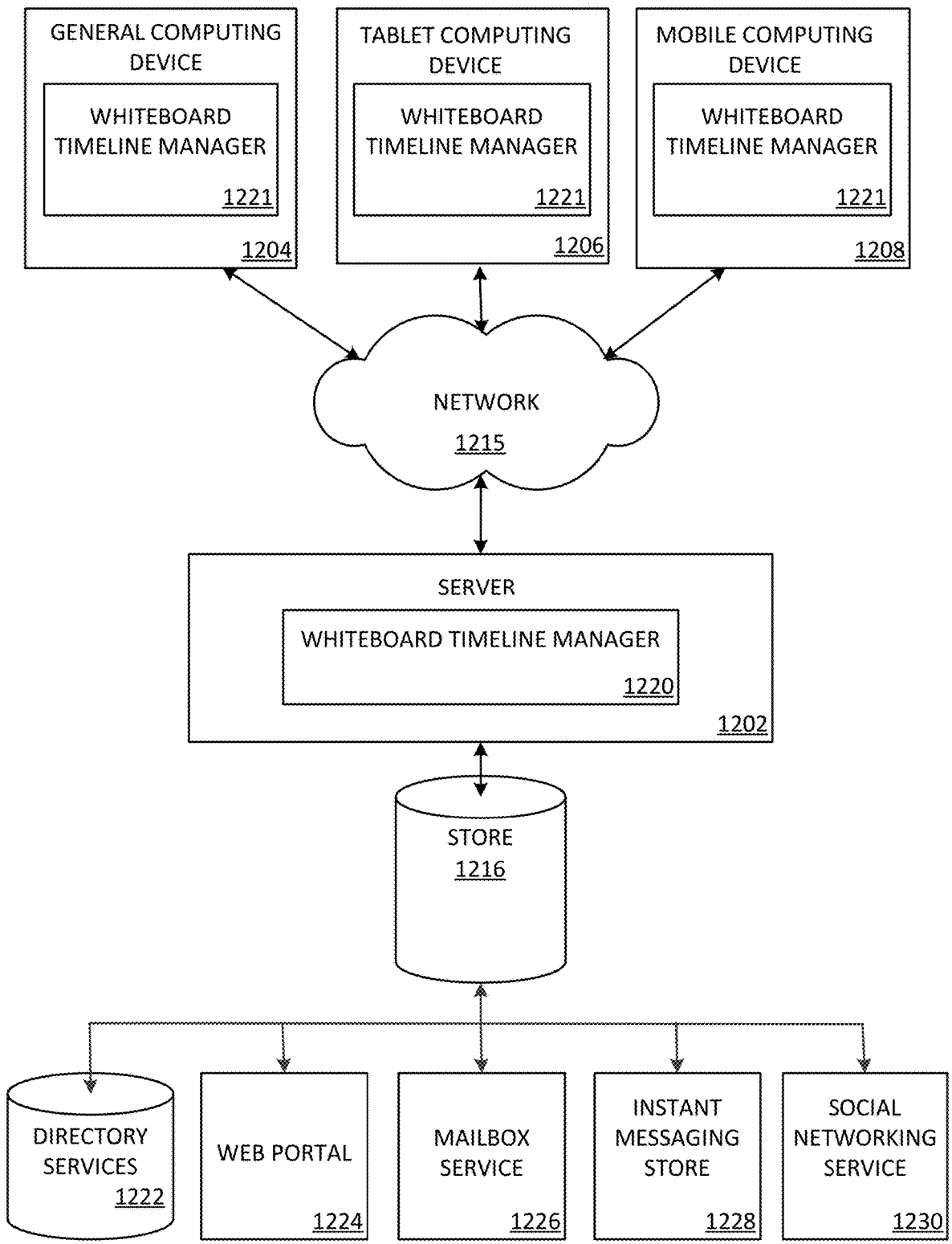
FIG. 12 is a simplified block diagram of a distributed computing system in which aspects of the present disclosure may be practiced.

FIG. 12 illustrates one aspect of the architecture of a system for processing data received at a computing system from a remote source, such as a general computing device 1204 (e.g., personal computer), tablet computing device 1206, or mobile computing device 1208, as described above. Content displayed at server device 1202 may be stored in different communication channels or other storage types. For example, various documents may be stored using a directory service 1222, a web portal 1224, a mailbox service 1226, an instant messaging store 1228, or a social networking service 1230. The whiteboard timeline manager 1221 may be employed by a client that communicates with server device 1202, and/or the whiteboard timeline manager 1220 may be employed by server device 1202. The server device 1202 may provide data to and from a client computing device such as a general computing device 1204, a tablet computing device 1206 and/or a mobile computing device 1208 (e.g., a smart phone) through a network 1215. By way of example, the computer system described above with respect to FIGS. 1-11 may be embodied in a general computing device 1204 (e.g., personal computer), a tablet computing device 1206 and/or a mobile computing device 1208 (e.g., a smart phone). Any of these embodiments of the computing devices may obtain content from the store 1216, in addition to receiving graphical data useable to either be pre-processed at a graphic-originating system or post-processed at a receiving computing system.

As should be appreciated, FIG. 12 is described for purposes of illustrating the present methods and systems and is not intended to limit the disclosure to a particular sequence of steps or a particular combination of hardware or software components.

Figure 13A:
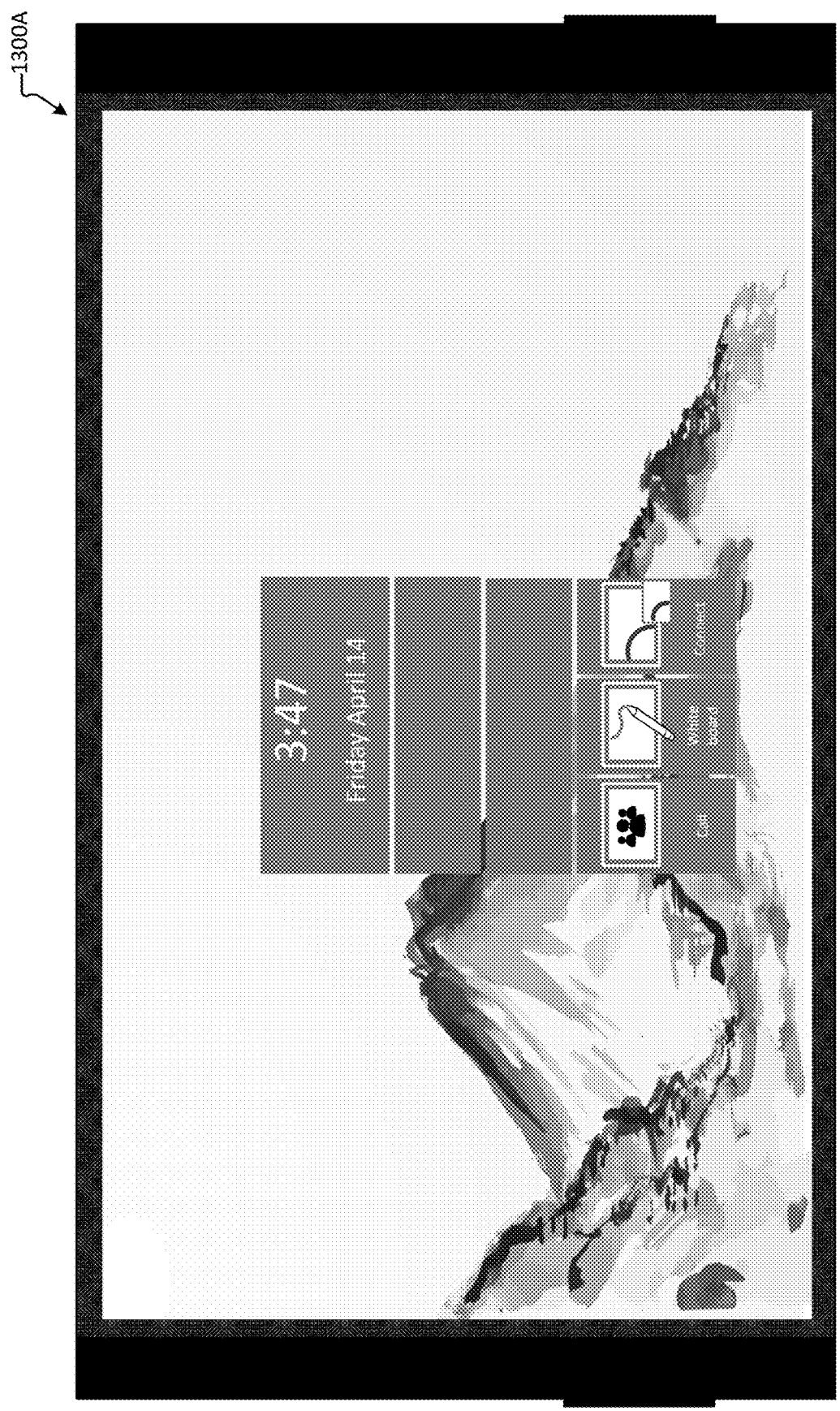
FIG. 13A illustrates a large-screen interactive computing device for executing one or more aspects of the present disclosure.
Figure 13B:
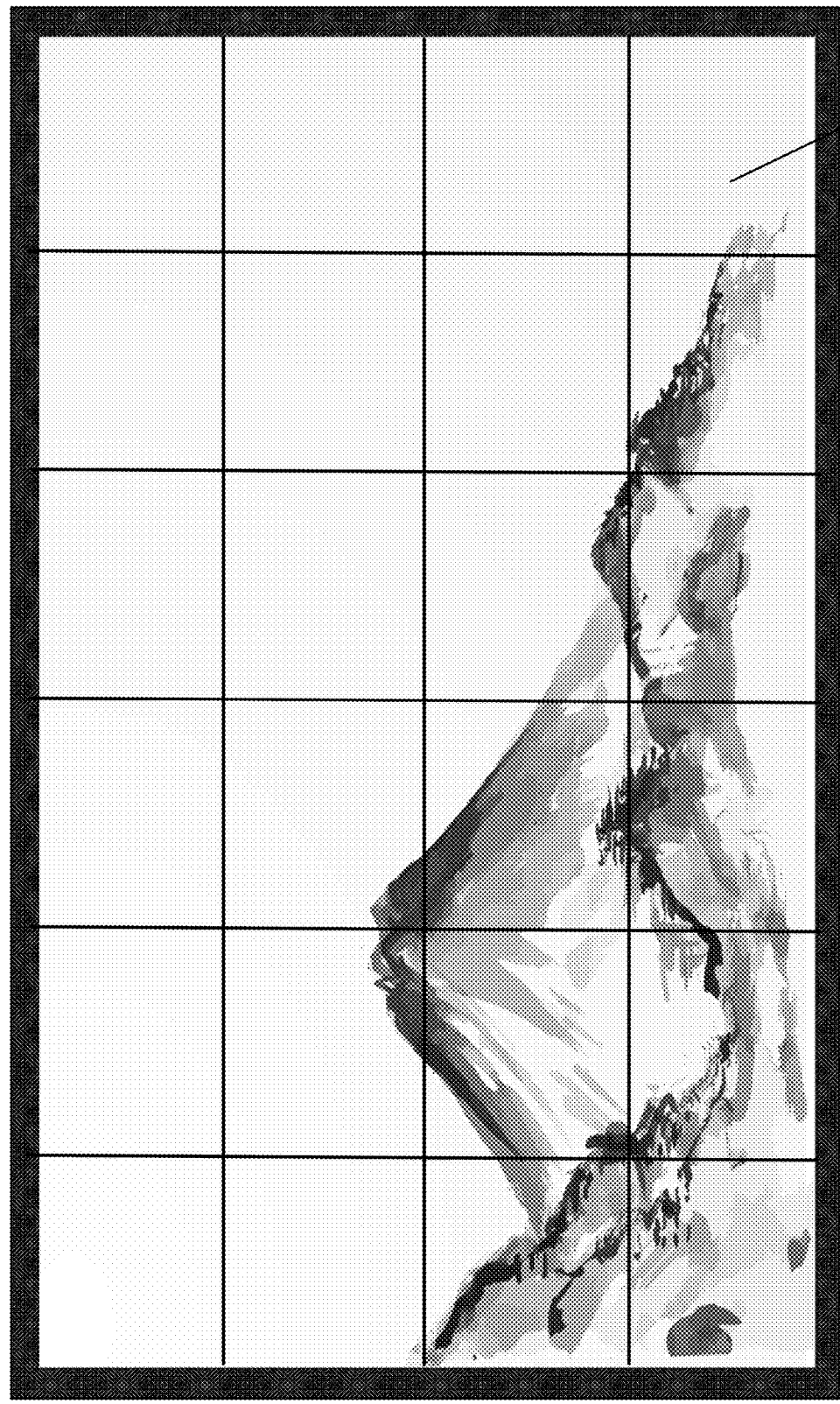
FIG. 13B illustrates a plurality of interoperative computing devices that provide a tiled screen display for executing one or more aspects of the present disclosure.

FIG. 13A illustrates a large-screen interactive computing device 1300A (e.g., a Microsoft® Surface Hub® or other large-screen, touch-enabled display) for executing one or more aspects of the present disclosure. FIG. 13B illustrates a plurality of interoperative computing devices 1300B that provide a tiled screen display for executing one or more aspects of the present disclosure. As illustrated, the plurality of interoperative computing devices 1300B may be coordinated to display a single screen image 1302, or any other display. The large-screen interactive computing device 1300A and/or the plurality of interoperative computing devices 1300B may further incorporate any of the hardware and/or software described with respect to FIGS. 1A-1B and FIGS. 10-12. Further, large-screen interactive computing device 1300A and/or the plurality of interoperative computing devices 1300B may implement any of the features or functions described with respect to FIGS. 2-9C. As should be appreciated, the large-screen interactive computing device 1300A and/or the plurality of interoperative computing devices 1300B may represent different embodiments of an electronic whiteboard, as described herein.

The exemplary computing devices 1300A and/or 1300B may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIGS. 13A and 13B are described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer system comprising:
   at least one processing unit; and
   at least one memory storing computer executable instructions that, when executed by the at least one processing unit, cause the computer system to perform a method, the method comprising:
   recording a series of ink strokes during a session on an electronic whiteboard;
   archiving the session including the series of ink strokes to a bookmark at a position on a timeline;
   receiving a selection of the bookmark at the position on the timeline;
   in response to the selection of the bookmark, providing access to the archived session;
   receiving an edit to at least one ink stroke of the series of ink strokes of the archived session, wherein the edit to the at least one ink stroke changes content of the archived session to create an edited session; and
   storing the edited session to the selected bookmark at the same position on the timeline.

2. The computer system of claim 1, further comprising:
in response to the selection of the bookmark, entering an edit mode.

3. The computer system of claim 1, wherein the edit to the archived session comprises one or more of:
a change to an ink stroke of the series of ink strokes;
a deletion of an ink stroke of the series of ink strokes; and
an addition of an ink stroke to the series of ink strokes.

4. The computer system of claim 3, wherein the change to an ink stroke comprises one or more of:
a change in color;
a change to stroke width;
a change in stroke length; and
a partial deletion.

5. The computer system of claim 1, wherein storing the edited session further comprises:
overwriting the archived session.

6. The computer system of claim 1, further comprising:
repositioning the edited session to a different position associated with a different bookmark on the timeline.

7. The computer system of claim 1, further comprising:
receiving a second selection of the selected bookmark at the position on the timeline; and
displaying the edited session.

8. The computer system of claim 7, wherein displaying the edited session comprises:
playing the edited session, wherein playing the edited session includes displaying at least one edited ink stroke within the series of ink strokes.

9. The computer system of claim 8, wherein playing the edited session comprises displaying the at least one edited ink stroke in a sequential order within the series of ink strokes.

10. The computer system of claim 2, wherein permissions are associated with the timeline, and wherein entering the edit mode requires a granted permission.

11. A computer-implemented method for editing a whiteboard timeline, the method comprising:
recording a first series of ink strokes on an electronic whiteboard;
associating the first series of ink strokes with a bookmark at a first position on a timeline;
receiving a selection of the bookmark at the first position on the timeline;
while maintaining the selection of the bookmark at the first position on the timeline, receiving an edit to at least one of the first series of ink strokes, wherein the edit to the at least one ink stroke changes content of the first series of ink strokes;
storing the edited first series of ink strokes to the selected bookmark at the first position on the timeline;
receiving an indication to reposition the selected bookmark associated with the edited first series of ink strokes to a second position on the timeline; and
repositioning the selected bookmark to the second position on the timeline.

12. The computer-implemented method of claim 11, wherein the indication to reposition the selected bookmark comprises dragging the bookmark to the second position.

13. The computer-implemented method of claim 11, wherein the selected bookmark is associated with a bookmark name, the method further comprising:
receiving an edit to the bookmark name.

14. The computer-implemented method of claim 11, wherein the second position on the timeline is to the left of the first position on the timeline.

15. The computer-implemented method of claim 11, wherein a second series of ink strokes is associated with a second bookmark, wherein the second series of ink strokes occurred after the first series of ink strokes in time, and wherein the second bookmark is positioned to the left of the second position of the selected bookmark on the timeline.

16. The computer-implemented method of claim 11, further comprising:
in response to repositioning the selected bookmark from the first position to the second position, renaming the bookmark.

17. A non-transitory computer storage medium storing computer executable instructions that, when executed by at least one processing unit, cause a computer system to:
record a series of ink strokes during a session on an electronic whiteboard;
associate the session including the series of ink strokes with a bookmark at a position on a timeline, wherein the bookmark has a bookmark name;
receive a selection of the bookmark at the position on the timeline;
in response to the selection of the bookmark at the position on the timeline, receive an indication to rename the selected bookmark at the position on the timeline; and
store a new name for the selected bookmark at the same position on the timeline to create a renamed bookmark associated with the session including the series of ink strokes.

18. The non-transitory computer storage medium of claim 17, the computer executable instructions further causing the computer system to:
receive one or more edits to the session; and
automatically rename the selected bookmark on the timeline.

19. The non-transitory computer storage medium of claim 18, wherein the indication to rename the selected bookmark comprises receiving the one or more edits.

20. The non-transitory computer storage medium of claim 17, further comprising:
receiving an indication to reposition the renamed bookmark from a first position to a second position along the timeline.

* * * * *